United States Patent
Nilsson et al.

(10) Patent No.: US 10,721,664 B2
(45) Date of Patent: Jul. 21, 2020

(54) METHODS AND NETWORK NODES FOR REUSE OF EPC SESSION BETWEEN 3GPP AND WLAN

(71) Applicant: Telefonaktiebolaget LM Ericsson (publ), Stockholm (SE)

(72) Inventors: Daniel Nilsson, Älvängen (SE); Qian Chen, Mölndal (SE); Chunbo Wang, Shanghai (CN)

(73) Assignee: Telefonaktiebolaget LM Ericsson (Publ) (SE)

( * ) Notice: Subject to any disclaimer, the term of this patent is extended or adjusted under 35 U.S.C. 154(b) by 272 days.

(21) Appl. No.: 15/518,436

(22) PCT Filed: Oct. 14, 2015

(86) PCT No.: PCT/EP2015/073771
§ 371 (c)(1),
(2) Date: Apr. 11, 2017

(87) PCT Pub. No.: WO2016/059109
PCT Pub. Date: Apr. 21, 2016

(65) Prior Publication Data
US 2017/0332296 A1    Nov. 16, 2017

Related U.S. Application Data

(60) Provisional application No. 62/064,133, filed on Oct. 15, 2014.

(51) Int. Cl.
*H04W 36/14* (2009.01)
*H04W 76/10* (2018.01)
(Continued)

(52) U.S. Cl.
CPC ........ *H04W 36/14* (2013.01); *H04W 36/0011* (2013.01); *H04W 36/36* (2013.01);
(Continued)

(58) Field of Classification Search
CPC ...... H04W 36/14; H04W 76/11; H04W 76/10
See application file for complete search history.

(56) References Cited

U.S. PATENT DOCUMENTS

| 8,244,242 B2 | 8/2012 | Zhang et al. |
| 8,855,071 B1 | 10/2014 | Sankaran et al. |

(Continued)

FOREIGN PATENT DOCUMENTS

| EP | 2081332 A1 | 7/2009 |
| WO | 2010122511 A1 | 10/2010 |
| WO | 2013044979 A1 | 4/2013 |

OTHER PUBLICATIONS

3GPP TS 23.402 v 12.6.0, Release 12, Sep. 2014 (Year: 2014).*
(Continued)

*Primary Examiner* — Siming Liu
(74) *Attorney, Agent, or Firm* — Christopher & Weisberg, P.A.

(57) ABSTRACT

A method performed in a mobility management node includes the mobility management node receiving a first Packet Data Network (PDN) activation request from a wireless local area network (WLAN) access gateway, the first PDN activation request specifying an access point name (APN) and a tunnel endpoint identifier (TEID) parameter for identifying the WLAN access gateway, the WLAN access gateway connected to a user equipment (UE). The method further includes in response to receiving the PDN activation request, the mobility management node (i) selecting a Packet Data Network Gateway (PGW) based on the specified APN, (ii) generating a second PDN activation session request that includes the TEID parameter for identifying the WLAN access gateway, (iii) selecting a serving gateway (SGW), and (iv) forwarding the second PDN activation request to the selected SGW.

42 Claims, 18 Drawing Sheets

(51) Int. Cl.
  *H04W 48/18* (2009.01)
  *H04W 36/00* (2009.01)
  *H04W 76/11* (2018.01)
  *H04W 36/36* (2009.01)
  *H04W 76/12* (2018.01)
  *H04W 84/12* (2009.01)
  *H04W 88/16* (2009.01)

(52) U.S. Cl.
  CPC .......... *H04W 48/18* (2013.01); *H04W 76/10* (2018.02); *H04W 76/11* (2018.02); *H04W 76/12* (2018.02); *H04W 84/12* (2013.01); *H04W 88/16* (2013.01)

(56) References Cited

U.S. PATENT DOCUMENTS

| | | | |
|---|---|---|---|
| 2014/0112146 A1* | 4/2014 | Hu | H04W 28/18 370/235 |
| 2015/0208281 A1* | 7/2015 | Kim | H04W 8/082 370/235 |
| 2017/0195930 A1* | 7/2017 | Tomici | H04W 8/06 |

OTHER PUBLICATIONS

International Search Report and Written Opinion dated Apr. 20, 2016 for International Application Serial No. PCT/EP2015/073771, International Filing Date: Oct. 14, 2015 consisting of (23-pages).

3GPP TR 23.852 V12.0.0 (Sep. 2013) 3rd Generation Partnership Project; Technical Specification Group Services and System Aspects; Study on S2a Mobility based on GPRS Tunnelling Protocol (GTP) and Wireless Local Area Network (WLAN) access to the Enhanced Packet Core (EPC) network (SaMOG); Stage 2 (Release 12) Sep. 12, 2013 consisting of 157-pages.

ETSI TS 123 402 V12.6.0 (Sep. 2014) Universal Mobile Telecommunications System (UMTS); LTE; Architecture enhancements for non-3GPP Accesses (3GPP TS 23.402 version 12.6.0 Release 12) Sep. 22, 2014 consisting of 290-pages.

European Examination Report dated Dec. 10, 2019 issued in corresponding European Patent Application No. 15 781 339.5, consisting of 7 pages.

F-06921—"3rd Generation Partnership Project; Technical Specification Group Services and System Aspects; Study on S2a Mobility based on GPRS Tunnelling Protocol (GTP) and Wireless Local Area Network (WLAN) access to the Enhanced Packet Core (EPC) network (SaMOG); Stage 2 (Release 12)", 3GPP Standard; 3GPP TR 23.852, 3rd Generation Partnership Project (3GPP), Mobile Competence Centre; 650, Route Des Lucioles; Sophia-Antipolis Cedex, France, vol. SA WG2, No. V12.0.0, Sep. 12, 2013, pp. 1-157, XP050712250; consisting of 157 pages.

"3rd Generation Partnership Project; Technical Specification Group Services and System Aspects; Architecture enhancements for non-3GPP accesses (Release 12)", 3GPP Draft; 23402-C60, 3rd Generation Partnership Project (3GPP), Mobile Competence Centre; 650, Route Des Lucioles; F-06921 Sophia-Antipolis Cedex; France, Sep. 24, 2014 (Sep. 24, 2014), XP050872437; consisting of 288 pages.

\* cited by examiner

METHODS AND NETWORK NODES FOR REUSE OF EPC SESSION BETWEEN 3GPP AND WLAN

CROSS-REFERENCE TO RELATED APPLICATIONS

This Application is a Submission Under 35 U.S.C. § 371 for U.S. National Stage Patent Application of International Application No. PCT/EP2015/073771, filed Oct. 14, 2015 entitled "METHODS AND NETWORK NODES FOR REUSE OF EPC SESSION BETWEEN 3GPP AND WLAN," which claims priority to U.S. Provisional Application No. 62/064,133, filed Oct. 15, 2014, entitled "METHODS AND NETWORKS NODES FOR REUSE OF EPC SESSION BETWEEN 3GPP AND WLAN," the entirety of both which are incorporated herein by reference.

TECHNICAL FIELD

Disclosed herein are, for example, methods and network nodes for reuse of EPC session between 3GPP and WLAN.

BACKGROUND

Today, mobile operators are using Wi-Fi to offload traffic from the mobile networks. However, the opportunity to improve end user experience regarding performance is also becoming more important. The current Wi-Fi deployments are completely separate from mobile networks, and are to be seen as non-integrated. The usage of Wi-Fi is driven due to the free and wide unlicensed spectrum, and the increased availability of Wi-Fi in mobile terminals like smartphones and tablets. The end users are also becoming more and more at ease with using Wi-Fi for example at offices and homes.

The different business segments for Wi-Fi regarding integration possibilities can be divided into mobile operator hosted/controlled vs. 3rd party hosted/controlled Wi-Fi Aps. As an example, a 3rd party is seen as any other entity other than mobile operator and that the 3rd party is not totally "trusted" by the mobile operator. The 3rd party could be for example a Wi-Fi operator or an end-user him/herself. In both segments, there exist public/hotspot, enterprise and residential deployments.

Wi-Fi integration towards the mobile core network is emerging as a good way to improve the end user experience further. These solutions consist mainly of the components: common authentication between 3GPP and Wi-Fi, and integration of Wi-Fi user plane traffic to the mobile core network. The common authentication is based on automatic SIM-based authentication in both access types. The Wi-Fi user plane integration provides the mobile operator the opportunity to provide the same services such as parental control and subscription based payment methods for the end users when connected both via 3GPP and via Wi-Fi. Different solutions are standardized in 3GPP: Overlay solutions (S2b, S2c) and integration solutions (S2a) are specified in 3GPP (S2a, S2b, S2c indicating the 3GPP interface/reference point name towards the PDN-GW). These solutions are specified in 3GPP TS 23.402.

FIG. 1 shows the network architecture for E-UTRAN and EPC and how the eNodeB is connected via the S1-interfaces, S1-MME and S1-U to the MME and Serving GW respectively. It also shows how the Wi-Fi access network is connected to the PDN-GW via the S2a interface (that is trusted Wi-Fi access) and to the 3GPP AAA Server via the STa interface. FIG. 2 illustrates a conventional deployment for untrusted Wi-Fi access.

One problem with the conventional deployment of Wi-Fi access is extensive signaling in handover scenarios. In this regard, when UE handover occurs between LTE and Wi-Fi, the session on the other side is always taken down. For example, if the UE handovers a PDN connection from the LTE to WLAN using S2a/S2b to PGW, the LTE session in MME, SGW and PGW is removed and a new session for WLAN is created. If dedicated bearers are used on LTE, the PGW has to re-create them on WLAN access network. If the UE handovers to LTE, the WLAN session in the PGW is removed and a new LTE session is created in the MME, SGW and PGW. If dedicated bearers are used on the WLAN, the PGW have to re-create them on LTE. FIG. 17 illustrates an example of the creation of bearers on the LTE side. The re-creation of bearers results in inefficient signaling. Additionally, the latency of the handover can be extensive. Furthermore, the PGW must use the S6b/Diameter interface when UE attach to WLAN to set the PGW id in HSS if handover is to be supported. Additionally, the S6b procedure towards HSS will also increase the HSS load. The S6b procedure also increases the AAA load.

Another problem with the conventional deployment of Wi-Fi access is that no location information for untrusted access is available. In this regard, when untrusted WLAN is used, no location information is received on the S2b interface, which results in the PGW being unable report any valuable location information to the PCRF.

Another problem with conventional deployment of Wi-Fi access is that the UE is in control of access selection. In this regard, it is very hard for the PGW to perform access steering when S2a/S2b is used toward the PGW. For instance, if UE is connected to LTE and initiate a handover to WLAN. Then, theoretically the PGW can deny the attempt if UE have very good connectivity/user experience on LTE but the PGW do not have such information regarding the network condition on the LTE side. This is mainly due to that PGW is a gateway node serving many accesses and logically it shouldn't need information about the access network.

SUMMARY

According to some embodiments, a method performed in a mobility management node includes the mobility management node receiving a first Packet Data Network (PDN) activation request from a wireless local area network (WLAN) access gateway, the first PDN activation request specifying an access point name (APN), and the WLAN access gateway connected to a user equipment (UE). In response to receiving the first PDN activation request, the method further includes the mobility management (i) selecting a Packet Data Network Gateway (PGW)(320) based on the specified APN, (ii) generating a second PDN activation session request that includes the TEID parameter for identifying the WLAN access gateway, (iii) selecting a serving gateway (SGW)(310), and (iv) forwarding the second PDN activation request to the selected SGW.

In some embodiments, the method further includes the mobility management node receiving a first create session response from the selected SGW, the mobility management node generating a second create session response based on the first create session response for establishing a control plane tunnel between the WLAN access gateway and the mobility management node, and a user plane tunnel between the WLAN access gateway and the SGW; and the mobility management node forwarding the second create session response to the WLAN access gateway.

In some embodiments, the mobility management node generates the second create session response by (i) setting a TEID parameter specified for the PGW-C S2b or S2a to the mobility management node, and (ii) setting a TEID parameter specified for the PGW-U S2b or S2a to the SGW-U.

In some embodiments, the method includes the mobility management node receiving a PDN handover request originated from the UE, in response to receiving the PDN handover request, the mobility management node sending PDN handover response to the UE, the mobility management node sending a modify bearer request to the SGW, the mobility management node receiving a modify bearer response from the SGW, and in response to receiving the modify bearer response, the mobility management node sending a delete bearer request to the WLAN access gateway.

In some embodiments, the mobility management node sets a user location information parameter in the second PDN activation request in accordance with location information stored in a 3GPP registration context of the UE.

In some embodiments, the first create session response is generated by the PGW and forwarded by the SGW to the mobility management node.

In some embodiments, the first create session response includes one or more UE parameters.

In some embodiments, the WLAN access gateway is an evolved Packet Data Gateway (ePDG).

In some embodiments, the WLAN access gateway is Trusted Wireless Access Gateway (TWAG).

In some embodiments, the mobility management node is a mobility management entity (MME) node.

In some embodiments, the mobility management node is a serving GPRS support node (SGSN).

In some embodiments, the first and second PDN activation requests are create session request messages.

In some embodiments, the PDN handover request is an attachment request with a handover indicator.

According to some embodiments, a method performed in a mobility management node includes the mobility management node receiving a PDN handover request from a wireless local area network (WLAN) access gateway, the WLAN access gateway connected to a user equipment (UE), the UE having a bearer setup on a network including a packet data network gateway (PGW) and a serving gateway (SGW). The method further includes the mobility management node sending a PDN handover response to the WLAN access gateway, the PDN handover response including parameters for establishing a control plane tunnel between the WLAN access gateway and the mobility management node, and a user plane tunnel between the WLAN access gateway and the SGW. The method also includes the mobility management node sending a modify bearer request to the SGW, the modify bearer request including a handover indicator and a tunnel endpoint identifier (TEID) parameter identifying the WLAN access gateway.

In some embodiments, the PDN handover response includes (i) a TEID parameter specified for the PGW-C set to the mobility management node, and (ii) a TEID parameter specified for the PGW-U set to the SGW-U.

In some embodiments, the PDN handover response includes a create bearer request in response to the mobility management node determining that at least one dedicated bearer is required.

In some embodiments, the WLAN access gateway is an evolved Packet Data Gateway (ePDG).

In some embodiments, the WLAN access gateway is Trusted Wireless Access Gateway (TWAG).

In some embodiments, the mobility management node is a mobility management entity (MME) node.

In some embodiments, the mobility management node is a serving GPRS support node (SGSN).

In some embodiments, the PDN handover request is a create session request with a handover indicator.

According to some embodiments, a method performed in an authentication server includes the authentication server retrieving an identity of a mobility management node on which a user equipment (UE) is registered. The method further includes the authentication server generating an identity for PDN GW interface using the identity of the mobility management node. The method also includes the authentication server sending the identity for the PDN GW interface to a wireless local area network (WLAN) access gateway.

In some embodiments, the identity for the PDN GW interface includes the identity of the mobility management node.

According to some embodiments, a mobility management node includes a processor and a computer readable medium coupled to the processor, said computer readable medium containing instructions executable by the processor. The mobility management node is operative to receive a first PDN activation request from a wireless local area network (WLAN) access gateway, the first PDN activation request specifying an access point name (APN) and a TEID parameter for identifying the WLAN access gateway, the WLAN access gateway connected to a user equipment (UE). In response to receiving the PDN activation request, the mobility management node is operative to (i) select a Packet Data Network Gateway (PGW) based on the specified APN, (ii) generate a second PDN activation session request that includes the TEID parameter for identifying the WLAN access gateway, (iii) select a serving gateway (SGW), and (iv) forward the second PDN activation request to the selected SGW.

In some embodiments, a mobility management node includes a processor and a computer readable medium coupled to the processor, said computer readable medium containing instructions executable by the processor. The mobility management node is operative to receive a PDN handover request from a wireless local area network (WLAN) access gateway, the WLAN access gateway connected to a user equipment (UE), the UE having a bearer setup on a network including a packet data network gateway (PGW) and a serving gateway (SGW). The mobility management node is operative to send a PDN handover response to the WLAN access gateway, the PDN handover response including parameters for establishing a control plane tunnel between the WLAN access gateway and the mobility management node, and a user plane tunnel between the WLAN access gateway and the SGW. The mobility management node is further operative to send a modify bearer request to the SGW, the modify bearer request including a handover indicator and a tunnel endpoint identifier (TEID) parameter identifying the WLAN access gateway.

In some embodiments, an authentication server includes a processor and a computer readable medium coupled to the processor, said computer readable medium containing instructions executable by the processor. The authentication server is operative to retrieve an identity of a mobility management node on which a user equipment (UE) is registered. The authentication server is further operative to generate an identity for an S2b interface using the identity of the mobility management node. The authentication server is further operative to send the identity for the S2b interface to a wireless local area network (WLAN) access gateway.

BRIEF DESCRIPTION OF THE DRAWINGS

The accompanying drawings, which are incorporated herein and form part of the specification, illustrate various embodiments.

DETAILED DESCRIPTION

Figure 1:
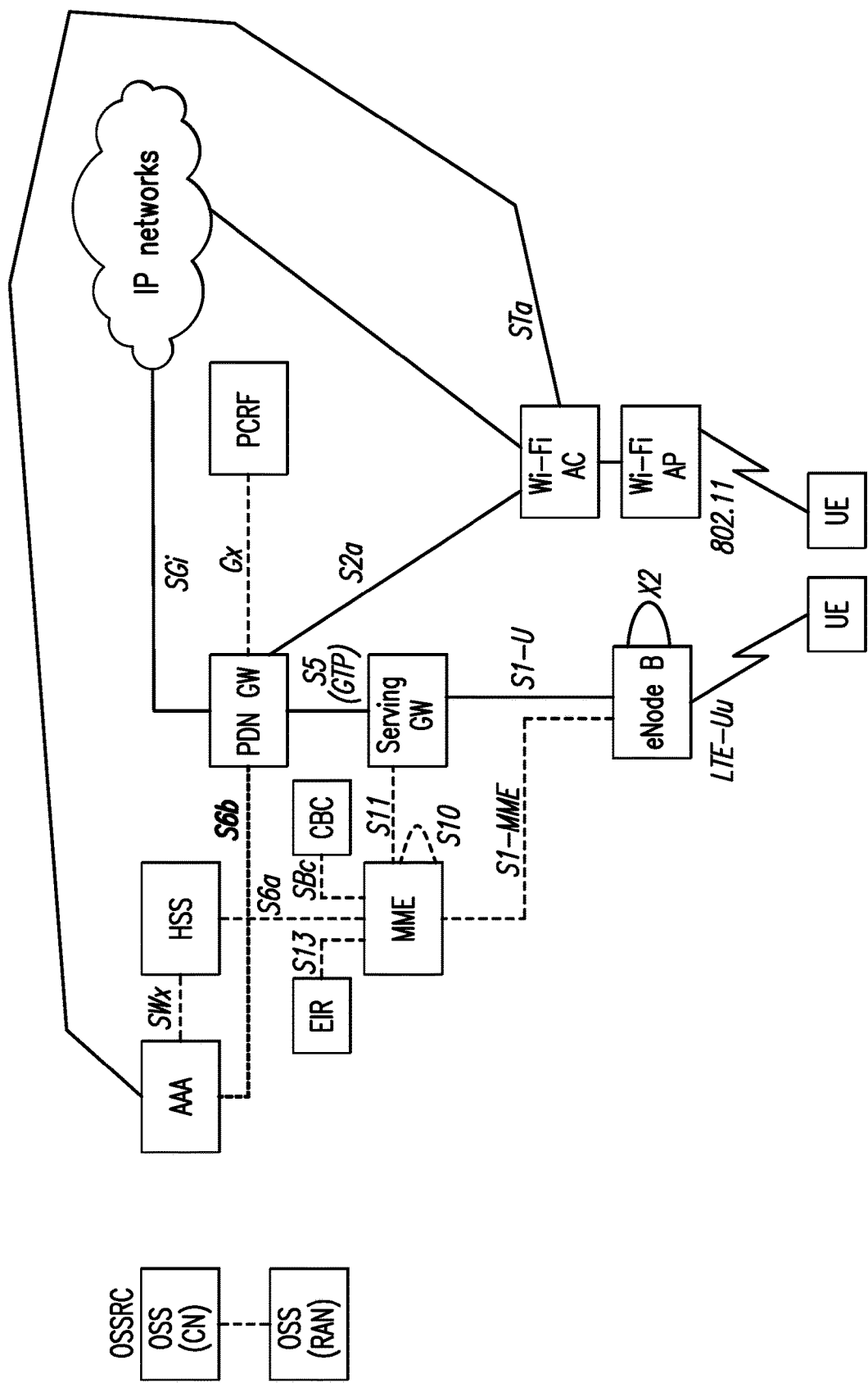
FIG. 1 illustrates a network architecture.
Figure 2:
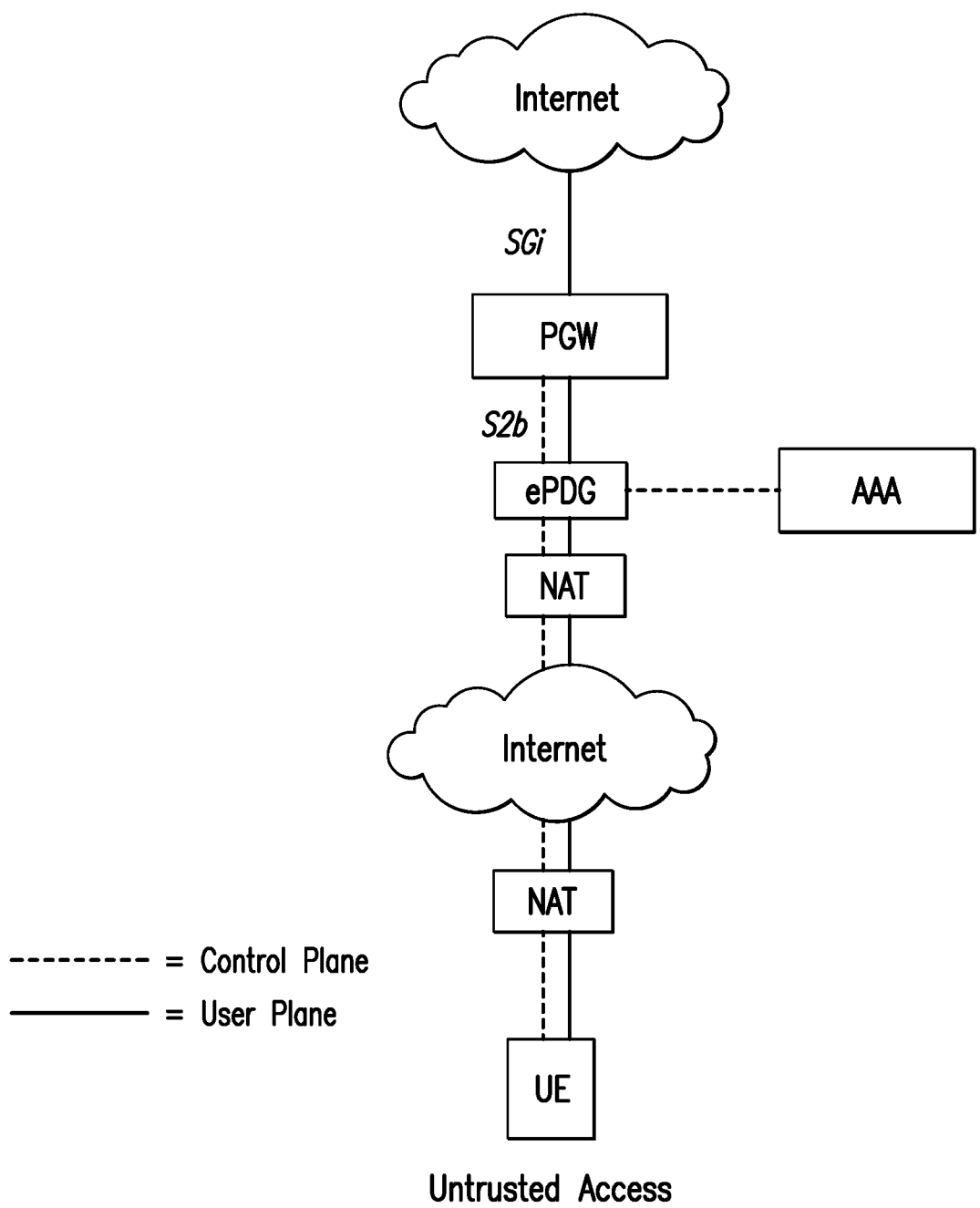
FIG. 2 illustrates a deployment for untrusted Wi-Fi access
Figure 3:
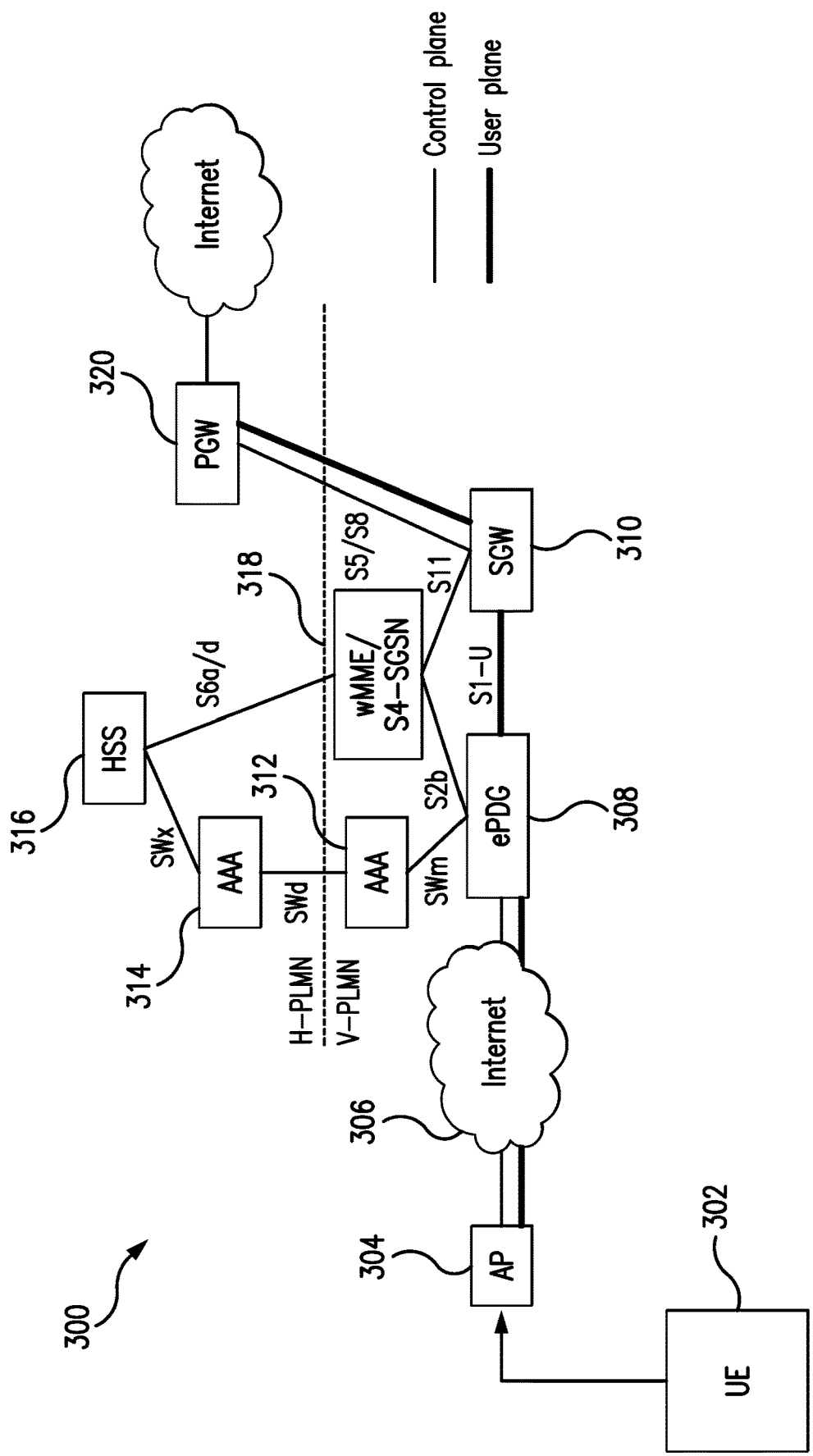
FIG. 3 illustrates an exemplary wireless communication system according to some embodiments.

FIG. 3 illustrates an embodiment of a wireless communication system 300. The wireless communication system 300 includes a UE 302 connected to an access point (AP) 304. The AP 304 is connected to an Internet network 306, which is connected to an evolved packet data gateway (ePDG). The ePDG 308 is connected to an SGW 310, which is connected to a PGW 320. The system 300 further includes authentication, authorization, and accounting (AAA) servers 312 and 314, Home Subscriber Server (HSS) 316, and MME/SGSN 318. In some embodiments, the UE 302 is a mobile device such as a smart phone or tablet device.

In some embodiments, a trusted wireless access gateway (TWAG) or the ePDG uses the S2a/S2b interface toward the MME node 318 instead of the PGW 320. Additionally, the network may steer a UE to the same MME on both LTE and WI-FI access. To direct the TWAG/ePDG to the correct MME node, the AAA can provide the information that resides in the HSS 316. Another mechanism may send one query to all MMEs in a pool asking about where the UE is registered. In some embodiments, another mechanism can send a query to one MME which will then find out where the UE is registered, which may occur by sending queries to other MMEs in the pool.

In some embodiments, when the MME 318 receives a S2a/S2b GTPv2 create session request with a handover indicator, the MME 318 may re-use the LTE session and does not have to create a new session. In this regard, since the MME can re-use the LTE session, the MME only needs to trigger a Modify Bearer procedure to the SGW to update a downlink TEID to re-aim a GTP-U tunnel from the eNB (or RNC in the case of 3G) to the TWAG/ePDG. From the SGW 310 and PGW 320 point of view, it follows the same procedure as Inter-RAT 3GPP handover.

In some embodiments, when there is a UE handover to LTE, the MME may re-use the PDN session and triggers the Modify Bearer procedure to SGW (e.g., change GTP-U tunnel from TWAG/ePDG to eNB).

Because the SGW and PGW PDN session is re-used, any already created dedicated bearer (e.g., if UE have an ongoing VoLTE call) between SGW and PGW still remains upon handover, the MME only needs to set up the dedicated bearer at the new access based on its bearer contexts. Furthermore, because the MME is used both for LTE and Wi-Fi accesses, there is no need for PGW to use S6b signaling for updating the PGW Id and APN towards the AAA server (e.g., AAA server further updates HSS), which is used to ensure the same PGW is selected during the handover between LTE and Wi-Fi. MME will provide this function automatically from its PDN context.

In some embodiments, the MME hides the ePDG/TWAN information from SGW and hide the SGW information from ePDG/TWAN so that SGW think that it is connected with an eNB on the user plane, and the ePDG/TWAG thinks that it is connected with a PGW on both control and user plane.

In some embodiments, the MME has location information knowledge for the UE when the UE resides in the LTE access. The MME can then use the LTE location information also when UE is in Wi-Fi. For example, when the UE has two PDN connections on LTE for the Internet and IMS, respectively, the UE handovers the IMS PDN connection to Wi-Fi but keeps Internet PDN connection on the LTE. The MME can use the 3GPP location information (e.g., ULI) for the PDN connection that is using Wi-Fi as access (i.e., IMS PDN connection in the above example) according to the current context if the UE is in 3GPP connected mode, or from the last time the UE was in 3GPP connected mode, or it can page the UE and get updated location information for the UE. This solution for location information is also valid if the UE sets up an initial PDN connection over Wi-Fi.

According to some embodiments, the MME is in control for the UE for both LTE and Wi-Fi, and the MME has direct interfaces to both radio accesses. The MME can therefore be in control of access selection by declining the handover procedure from one access to another. For example, when the UE tries to do handover from LTE to Wi-Fi, the MME can query the LTE network about available user throughput on the LTE side and based on that make an access selection on behalf of the UE.

These embodiments are applicable for S4-SGSN and 3G connections. These embodiments are also applicable to all non-3GPP accesses (including trusted Wi-Fi) supporting handover between 3GPP and non-3GPP.

Figure 4:
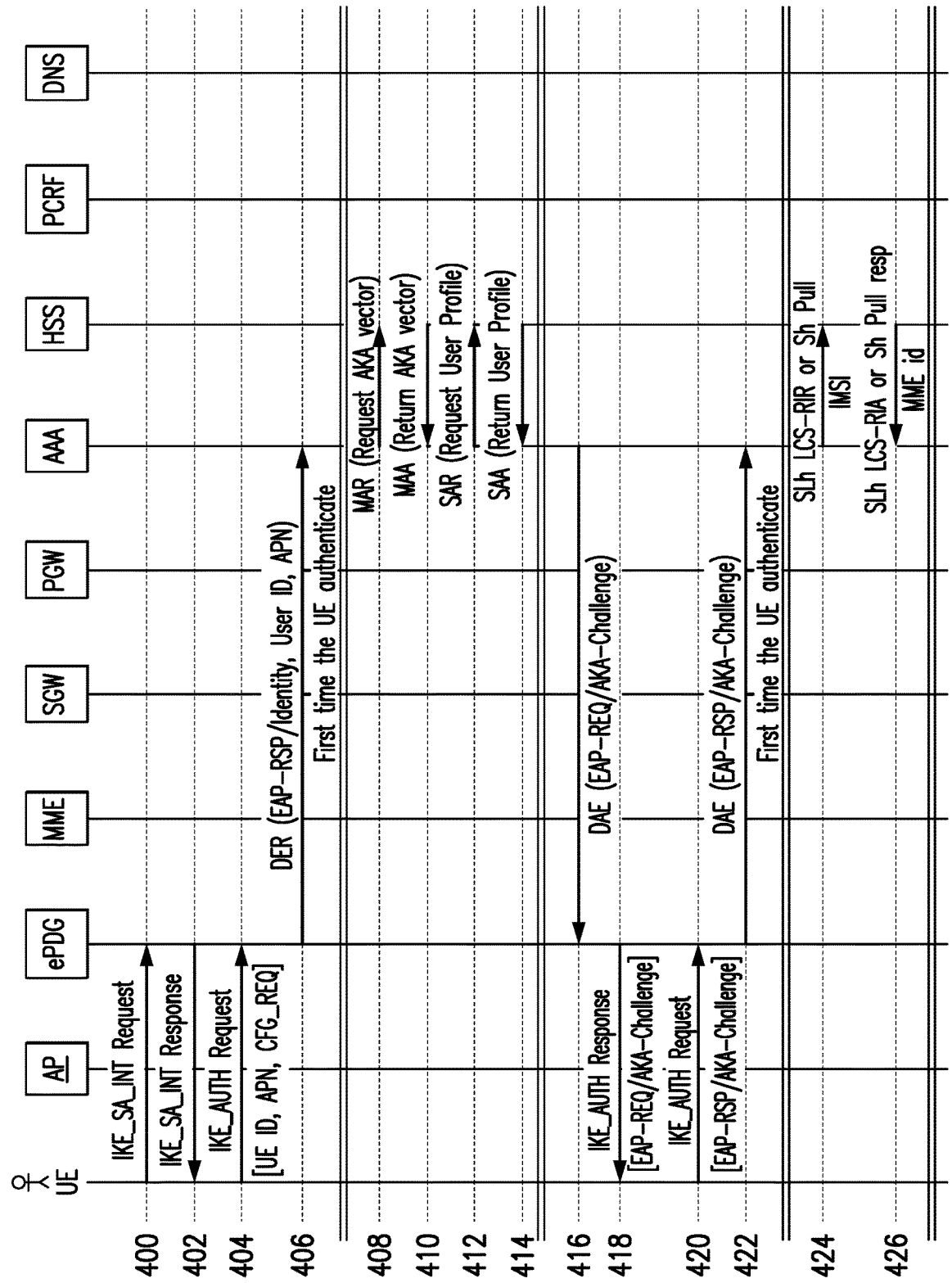
FIG. 4 illustrates a sequence diagram according to some embodiments.
Figure 5:
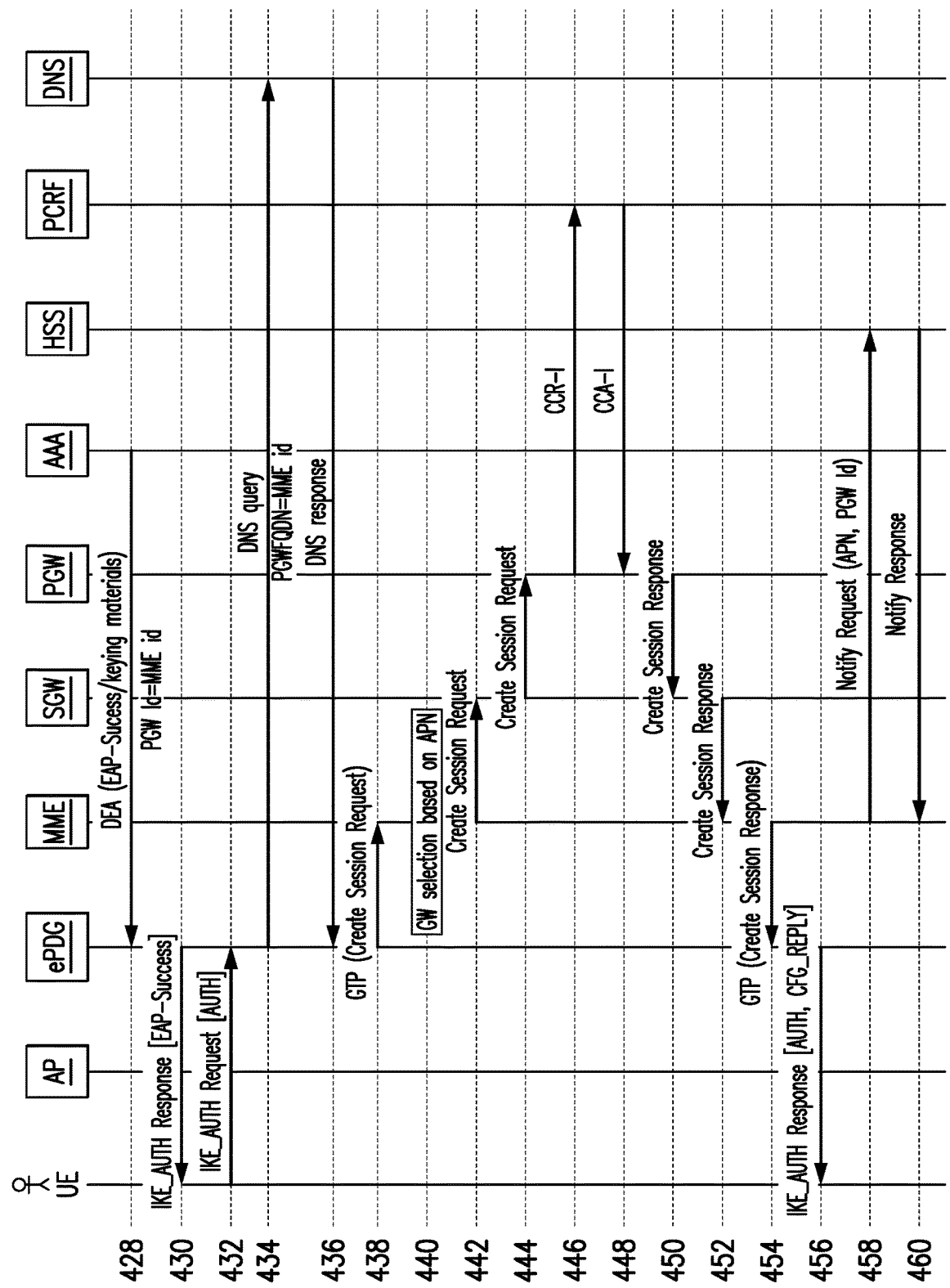
FIG. 5 illustrates a sequence diagram according to some embodiments.

FIGS. 4 and 5 are a sequence diagram illustrating an embodiment for attaching to a Wi-Fi network.

In steps 400-422, an IKEv2 access authentication procedure is performed (refer to Chapter 6.5 of TS 33.402 for details). The IKEv2 procedure may be performed in accordance with any authentication procedure known to one of ordinary skill in the art.

In step 424, the AAA server triggers a SLh LCS-RIR (refer to TS 29.173) or Sh Pull (refer to TS 29.329) procedure to retrieve the Identity of the MME on which the UE is registered currently. Another mechanism to get the identity is to send one query to all MMEs in a pool asking about where the UE is registered. In another mechanism to get the identity, a query is sent to one MME which will then find out where the UE is registered, which may occur by sending queries to other MMEs in the pool.

In step 426, the HSS returns the Identity (FQDN) or IP address of the MME on which the UE is registered currently according to SLh or Sh procedure.

In step 428, the AAA server builds the MME Identity for the S2b interface by adding, for example, a prefix (e.g., 'S2b') in front of the MME Id received from HSS, and sends DEA/EAP-Success message towards the ePDG. The PGW Identity field of the DEA/EAP-Success message is set to the MME identity for S2b interface built by the AAA server. If the UE is not registered in any MME in the visited network (e.g., UE detached from LTE access or have not registered in visited network), the AAA server can fallback to the standardized solution with PGW terminating S2b. The AAA server can detect from realm part of MME FQDN if the MME is in the visited or home network.

In steps 430 and 432, an IKEv2 access authentication procedure continues in accordance with any authentication procedure known to one of ordinary skill in the art.

In steps 434 and 436, the ePDG regards the MME Id as the PGW Id for S2b interface and performs DNS query to get the IP address of the MME.

In step 438, the ePDG sends Create Session Request to the MME as the normal GTPv2 S2b initial PDN connection setup request.

In step 440, the MME receives the Create Session Request for the GTPv2 S2b initial connection setup request, and then the MME selects a PGW based on the requested APN as the normal LTE initial PDN connection setup request.

In step 442, the MME selects a SGW as the LTE initial attach and sends the Create Session Request with RAT type=WLAN to the SGW via S11 interface. In some embodiments, the MME hides the ePDG info from the SGW. For example, the MME sets the values of the eNB-U F-TEID parameter in the Create Session Request to those of the ePDG-U F-TEID so that the user plane of ePDG and SGW can be connected. From the SGW point of view, its GTP user plane is connected with an eNB as the normal S1-U interface. There is no difference between GTP S1-U and S2b-U interface. In this regard, for example, GTP-U handling is the same for S1-U and S2b-U interface, where GTP-U packet format is the same for the S1-u and S2b-U. In some embodiments, the MME sets the ULI parameter in the Create Session Request to the SGW according to the location information stored in the 3GPP registration context of the UE.

In step 444, the SGW further sends a Create Session Request with RAT type=WLAN to the PGW via S5/S8 interface.

In steps 446 and 448, the PGW receives the Create Session Request and performs an IP-CAN session establishment as defined in TS 23.203.

In step 450, the PGW accepts the PDN connection creation request and returns a Create Session Response with the UE IP address and other UE requested parameters (such as PCO).

In step 452, the SGW returns a Create Session Response to the MME with its user plane F-TEID parameters and the UE parameters returned by PGW.

In step 454, the MME sends back a Create Session Response with the UE IP address (and other PGW returned UE parameters) to the ePDG via S2b.

In step 456, the ePDG sends IKEv2 AUTH_RSP with the UE IP address (and other PGW returned UE parameters) as payload.

In steps 458 and 460, the MME updates the HSS with the APN and the PGW Id by the standard S6a interface procedure between MME and HSS. In some embodiments, the MME info is transparent to the ePDG. From the ePDG point of view, it is connected with a PGW. The MME shall set the values of the PGW-C F-TEID parameter in the Create Session Response to those of the MME-C F-TEID for S2b. In some embodiments, the MME hides the SGW info from the ePDG. Specifically, the MME shall set the values of the S2b PGW-U F-TEID parameter in the Create Session Response to those of the SGW-U F-TEID so that the user plane of the ePDG and SGW can be connected. From the ePDG point of view, its GTP user plane is connected as the normal S2b-U interface.

Figure 6:
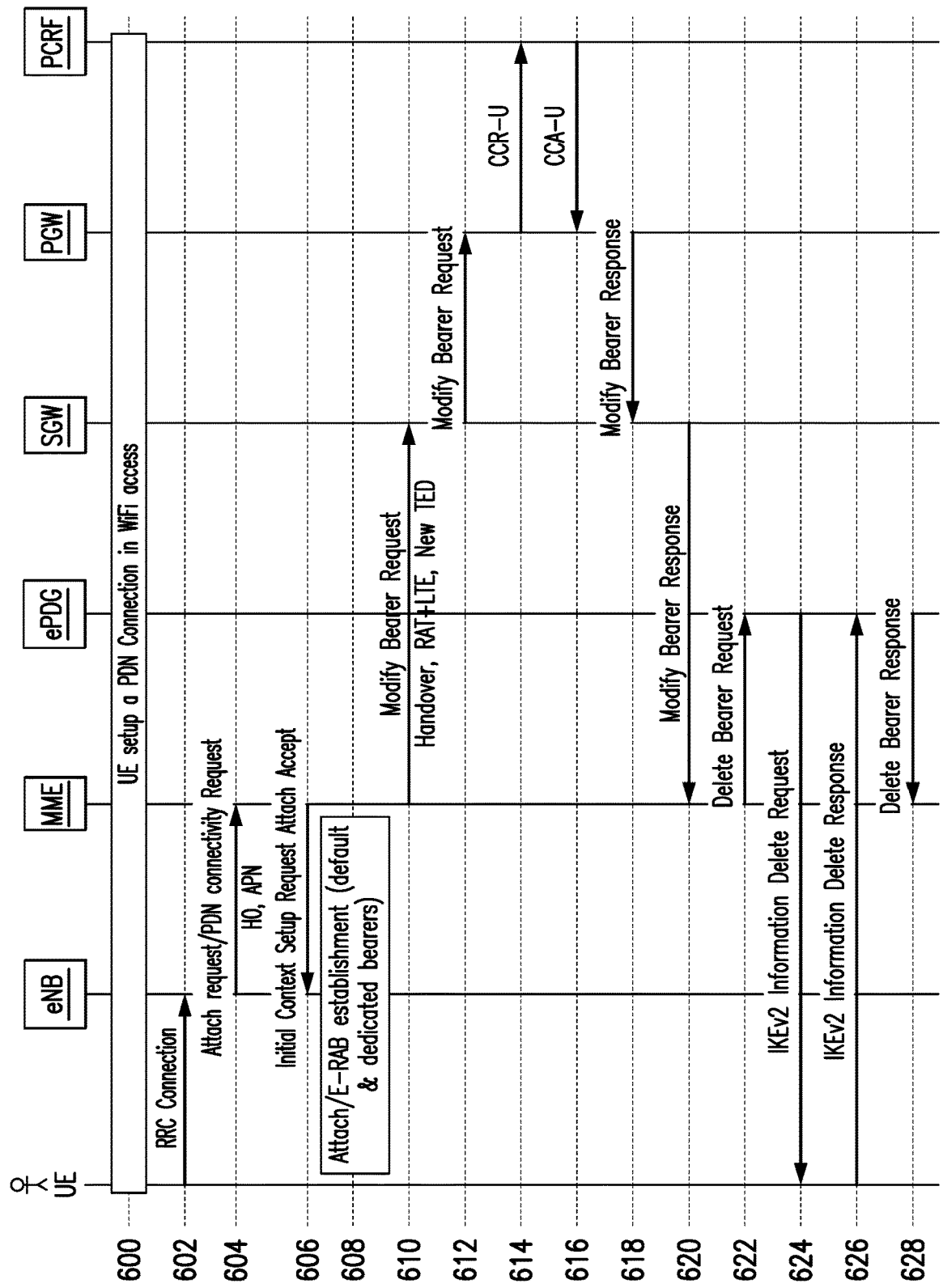
FIG. 6 illustrates a sequence diagram according to some embodiments.

FIG. 6 is a sequence diagram illustrating an embodiment for performing handover from a Wi-Fi connection to LTE.

In step 600, the UE has a PDN connection established over Wi-Fi access. The PDN connection may be established in accordance with steps illustrated in FIGS. 4 and 5.

In step 602, the UE decides to handover from Wi-Fi access to E-UTRAN. A RRC connection will be established between UE and eNB.

In step 604, the UE sends Attach request/PDN Connectivity Request with HO indication to MME via eNB. Based on the GUTI received from UE, the eNB will select the MME which holds the UE's E-UTRAN registration context, which is also the MME which is currently terminating the S2b interface for the UE at Wi-Fi access.

In step 606, the MME detects the handover request from non-3GPP. Since the MME has already established the PDN connection to the SGW and PGW for the UE at Wi-Fi access, the MME skips the PDN session creation procedure, and the MME also skips the HSS update procedure as the MME holds the UE's E-UTRAN registration context. Consequently, the MME will directly send an Attach Accept and trigger E-RAB establishment procedure based on the existing bearer contexts, such as QoS parameters, TFT and etc.

In step 608, E-RAB establishment procedure with both default and dedicated bearers is performed with the MME.

In step 610, after successful E-RAB establishment, the MME sends a Modify Bearer Request with Handover Indication, E-UTRAN RAT type and eNB user plane parameters to SGW as the Intra-3GPP IRAT handover procedure.

In step 612, the SGW forwards the Modify Bearer Request with Handover Indication to the PGW so that the PGW can update the RAT change to PCRF.

In step 614, PGW receives the Modify Bearer Request with Handover Indication and detects the RAT changed from WLAN to E-UTRAN. The PGW triggers PCC update procedure by sending CCR-U to PCRF.

In step 616, the PCRF replies with CCA-U. If there are some PCC rules update included in the CCA-U, the PGW will trigger Bearer Update procedure after the Bearer Modification procedure.

In step 618, the PGW follows the Intra-3GPP IRAT handover process and returns Modify Bearer Response to the SGW.

In step 620, the SGW forwards the Modify Bearer Response to the MME.

In steps 622-628, the MME triggers the non-3GPP connection release to ePDG.

Figure 7:
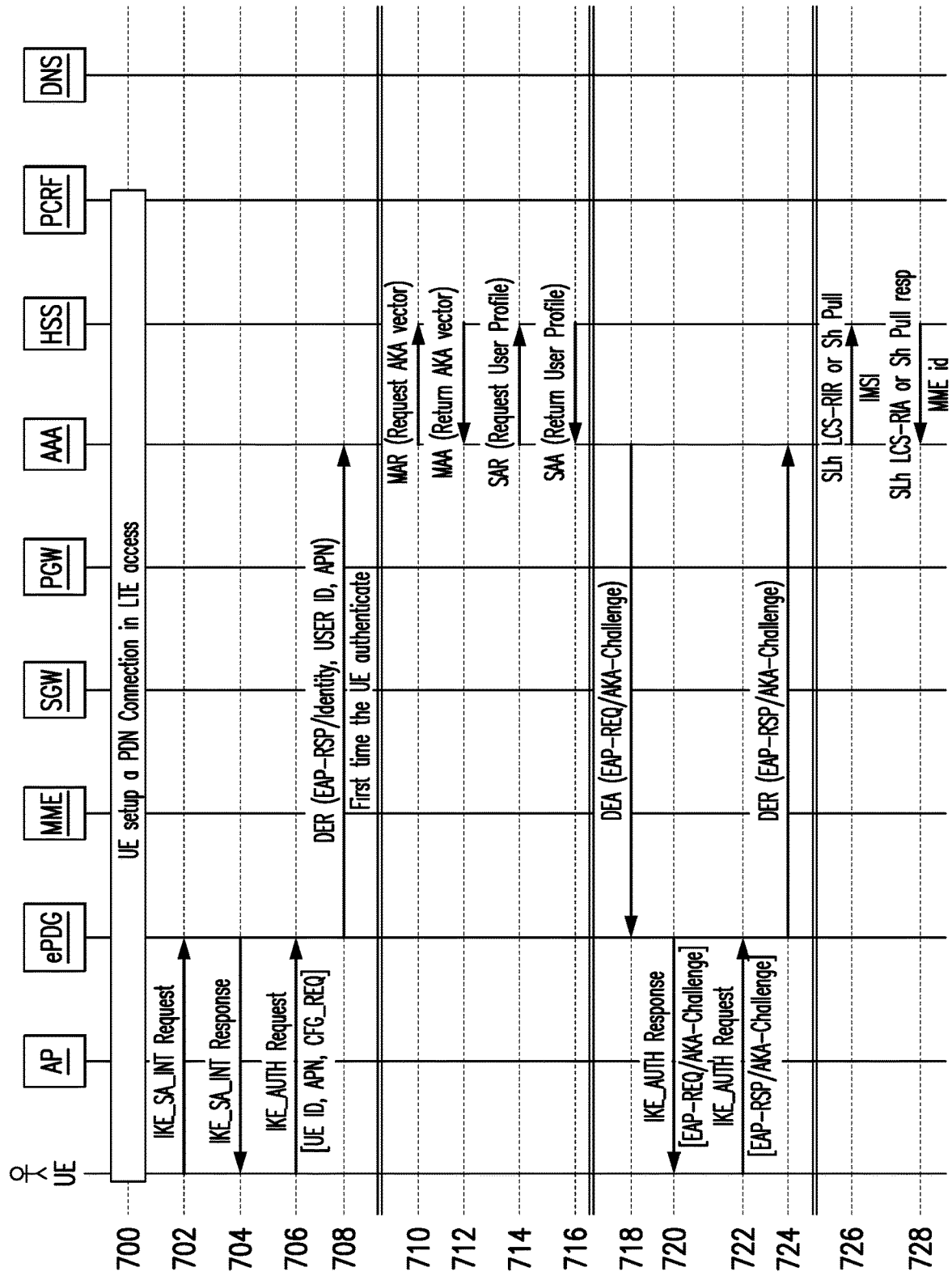
FIG. 7 illustrates a sequence diagram according to some embodiments.
Figure 8:
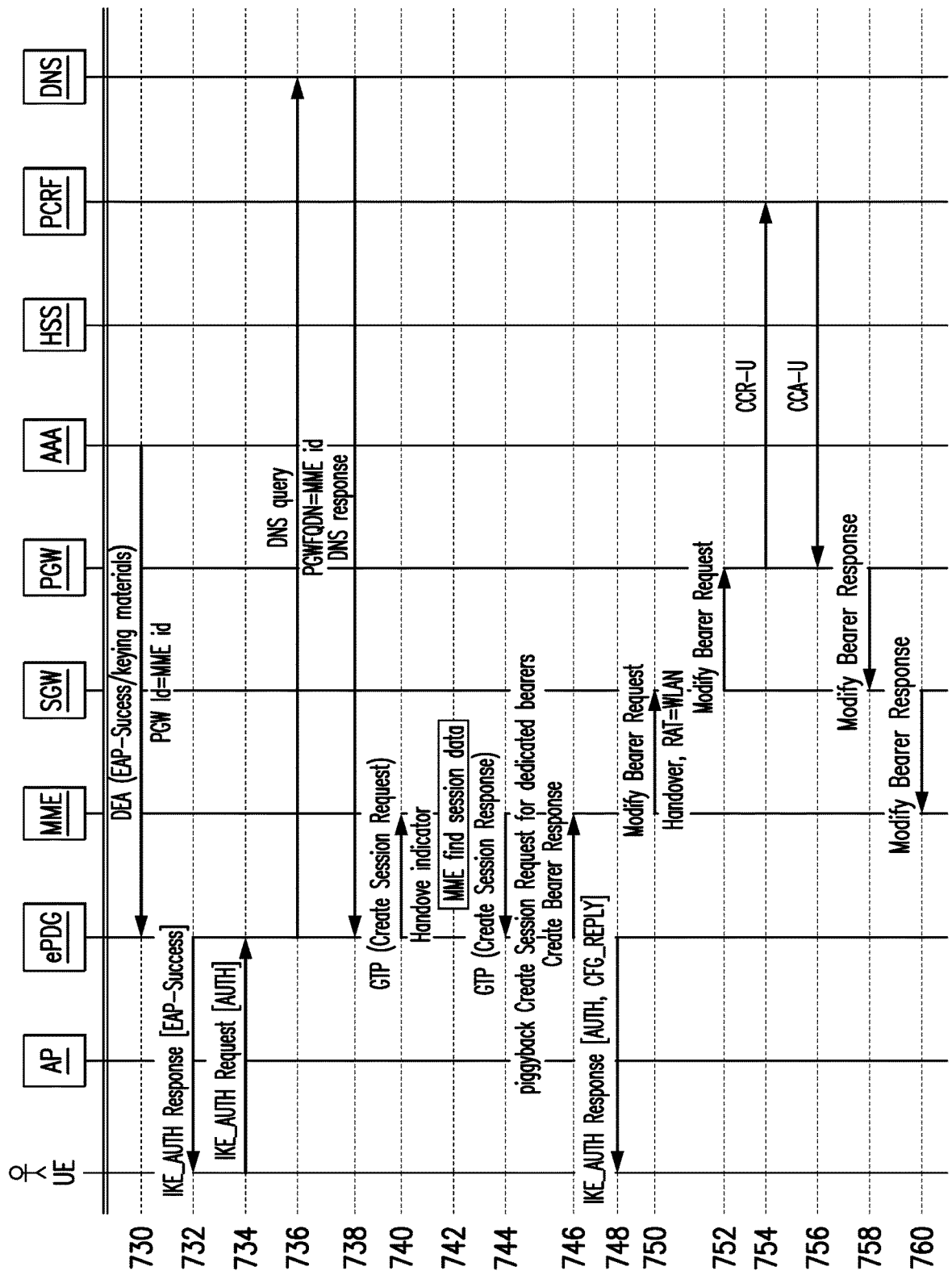
FIG. 8 illustrates a sequence diagram according to some embodiments.

FIGS. 7 and 8 are a sequence diagram illustrating an embodiment for performing a handover from LTE to Wi-Fi.

In step 700, the UE has a PDN connection established over LTE access. The PDN connection over LTE access may be setup in accordance with any procedure known to one of ordinary skill in art for establishing a connection over LTE.

In steps 702-724, an IKEv2 access authentication procedure is performed (refer to Chapter 6.5 of TS33.402 for details). The IKEv2 procedure may be performed in accordance with any authentication procedure known to one of ordinary skill in the art.

In step 726, the AAA server shall trigger a SLh LCS-RIR (refer to TS 29.173) or Sh Pull (refer to TS 29.329) procedure to retrieve the Identity of the MME on which the UE is registered currently.

In step 728, the HSS returns the Identity (FQDN) of the MME on which the UE is registered currently according to SLh or Sh procedure.

In step 730, the AAA builds the MME Identity for S2b interface by adding a prefix (e.g., 'S2b') in front of the MME Id received from HSS and sends DEA/EAP-Success message towards the ePDG. The PGW Identity field of the DEA/EAP-Success message is set to the MME identity for S2b interface built by the AAA server.

In steps 732 and 734, the IKEv2 access authentication procedure continues.

In steps 736 and 738, the ePDG regards the MME Id as the PGW Id for S2b interface and performs DNS query to get the IP address of the MME.

In step 740, the ePDG sends Create Session Request with Handover Indication to the MME as the normal GTPv2 S2b handover request.

In step 742, the MME receives the Create Session Request with Handover Indication and detects that there is the corresponding PDN session context existed at LTE side.

In step 744, the MME acknowledges the handover by sending Create Session Response to the ePDG. If there are dedicated bearers to be created, MME shall piggyback the Create Bearer Request with the Create Session Response. If no dedicated bearer to be created, the step continues to step 748.

In some embodiments, the MME info is transparent to ePDG. For example, from the ePDG point of view, it is connected with a PGW. The MME sets the values of the PGW-C F-TEID parameter in the Create Session Response to those of the MME-C F-TEID for S2b. In some embodiments, the MME hides the SGW info from the ePDG. Specifically, the MME sets the values of the PGW-U F-TEID parameter in the Create Session Response to those of the SGW-U F-TEID so that the user plane of ePDG and SGW can be connected. There is no difference between GTP S1-U and S2b-U interface since both use plain GTP-U.

In step 746, the ePDG sends the Create Bearer Response to the MME for the dedicated bearers.

In step 748, the ePDG sends IKEv2 AUTH_RSP to UE. In some embodiments, step 748 may be performed at the same time as step 750.

In step 750, sine MME has already established the PDN connection to SGW and PGW for the UE at LTE access, the MME sends a Modify Bearer Request with Handover Indication and WLAN RAT type to the SGW as the Intra-3GPP IRAT handover procedure. In some embodiments, the MME shall hide the ePDG info from the SGW so that SGW behaves as Intra-3GPP IRAT handover. Specifically, the MME sets the values of the eNB-U F-TEID parameter in the Modify Bearer Request to those of the ePDG-U F-TEID so that the user plane of ePDG and SGW can be connected. From the SGW point of view, its user plane is connected with an eNB with normal S1-U interface. In some embodiments, the MME sets the ULI parameter in the Modify Bearer Request to the SGW according to the current 3GPP location information stored in the PDN context of the UE.

In step 752, the SGW forwards the Modify Bearer Request with Handover Indication to the PGW so that the PGW can update the RAT change to PCRF.

In step 754, the PGW receives the Modify Bearer Request with Handover Indication and detects the RAT changed from E-UTRAN to WLAN. The PGW triggers PCC update procedure by sending CCR-U to PCRF.

In step 756, the PCRF replies with CCA-U. If there are some PCC rules update included in the CCA-U, the PGW will trigger Bearer Update procedure after the Bearer Modification procedure.

In step 758, The PGW follows the Intra-3GPP IRAT handover process and returns Modify Bearer Response to the SGW.

In step 760, The SGW forwards the Modify Bearer Response to the MME.

Figure 9A:
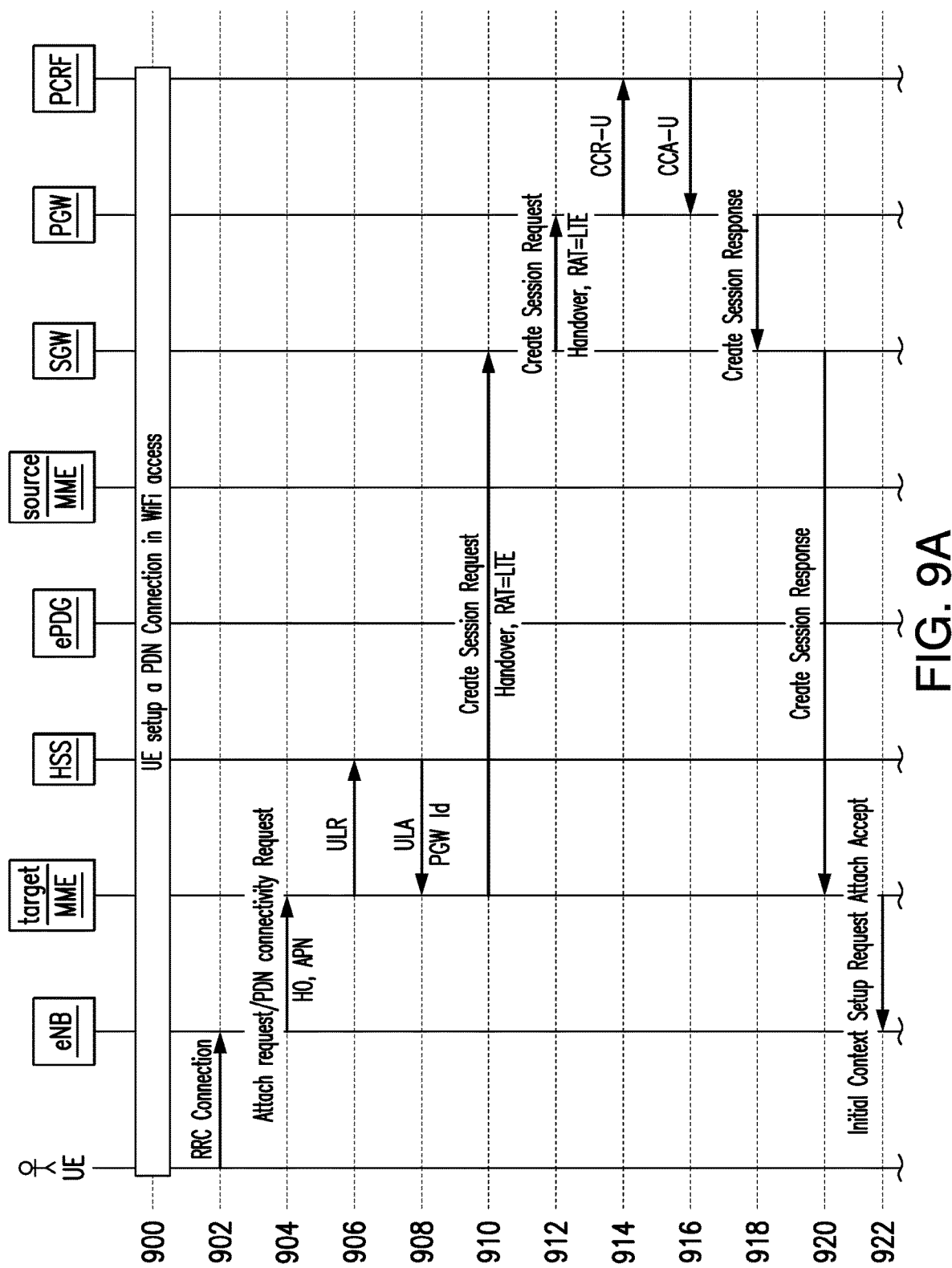
FIGS. 9A-9B illustrate a sequence diagram according to some embodiments.
Figure 9B:
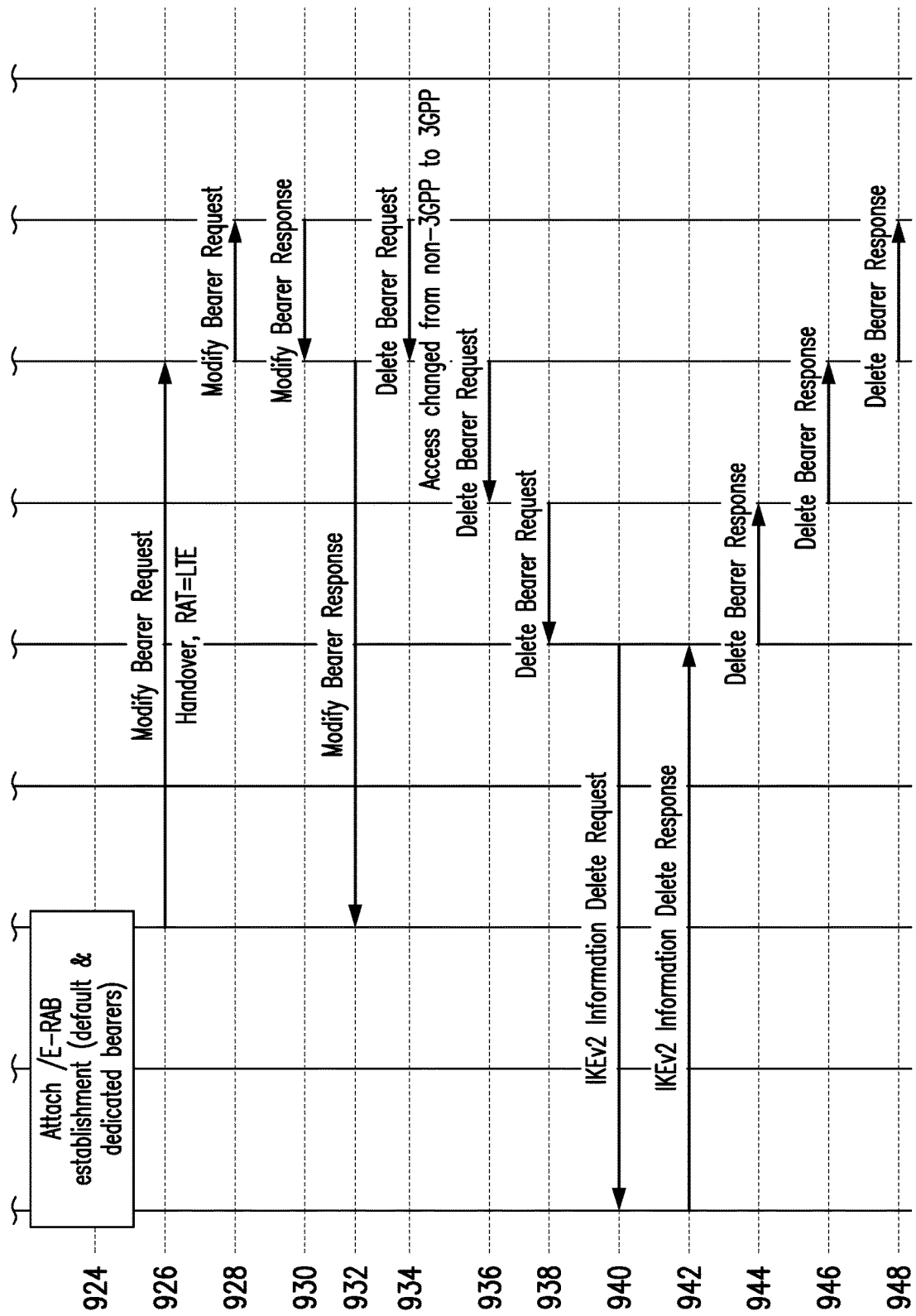

FIGS. 9A-9B is a sequence diagram illustrating an embodiments for performing handover from Wi-Fi to LTE when the UE is not registered on a target MME. This case may occur when the UE moves out the MME pool area or the source MME fails.

In steps 900-910, the UE triggers a handover from non-3GPP to 3GPP. A target MME which doesn't host the UE S2b connection context is selected. The target MME follows the standard non-3GPP to 3GPP handover procedure. At step 908, the MME will get the PGW Id from the HSS, then at step 910, the MME sends a Create Session Request with Handover Indication to the selected SGW.

In step 912, the PGW receives a Create Session Request with Handover Indication, then the PGW shall check whether there is an existing PDN context with non-3GPP RAT type (i.e., WLAN in this scenario) matching the IMSI and APN included in the Create Session Request. If there is such a matching found, the PGW shall follow the standard non-3GPP to 3GPP handover procedure.

In steps 914-932, the PGW continues the non-3GPP to 3GPP handover following the standard procedure.

In steps 934 to 948, the PGW shall trigger the old PDN connection deletion on the non-3GPP (i.e., Wi-Fi access).

Figure 10:
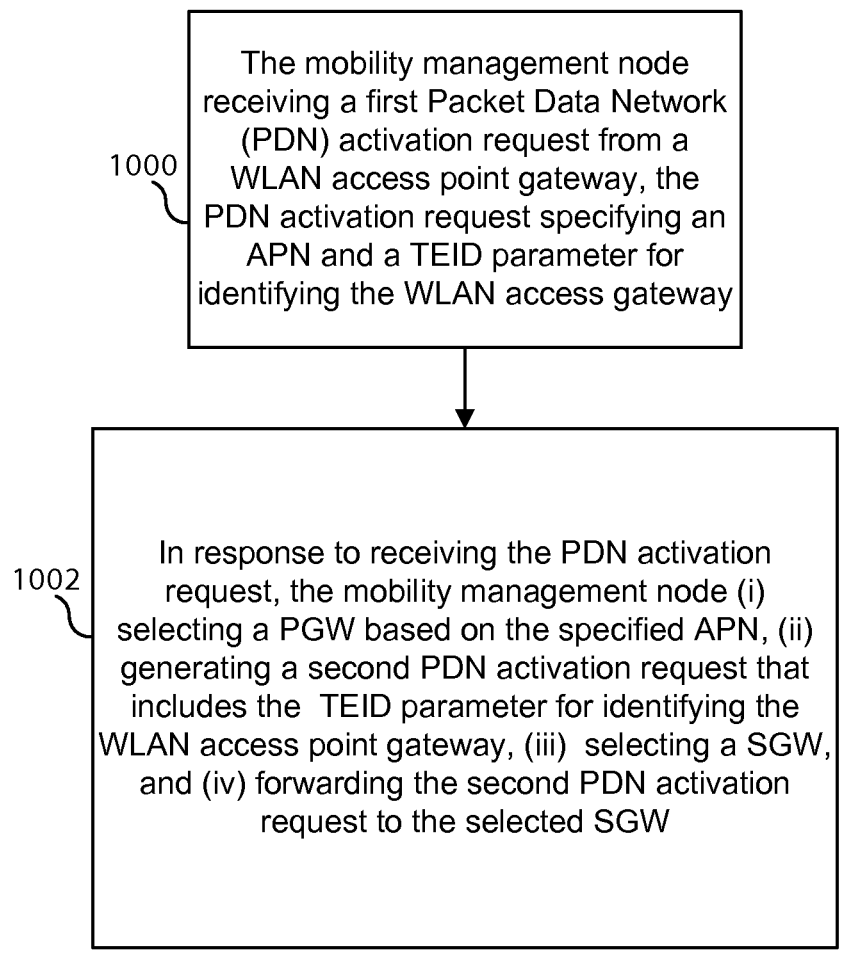
FIG. 10 is a flow chart illustrating a process according to some embodiments.

FIG. 10 illustrates a process performed by a mobility management node such as the MME or SGSN. The process may start at 1000, where the mobility management node receives a first PDN activation request from a wireless local area network (WLAN) access gateway, and where the PDN activation request specifies an access point name (APN) and a TEID parameter for identifying the WLAN access gateway. The WLAN access gateway may be the ePDG or TWAG. At step 1002, in response to receiving the PDN activation request, the mobility management node (i) selects a Packet Data Network Gateway (PGW) based on the specified APN, (ii) generates a second PDN activation request by setting a tunnel endpoint identifier (TEID) parameter of the request to identify the WLAN access gateway, (iii) selects a serving gateway (SGW), and (iv) and forwards the generated second PDN activation request to the selected SGW.

Figure 11:
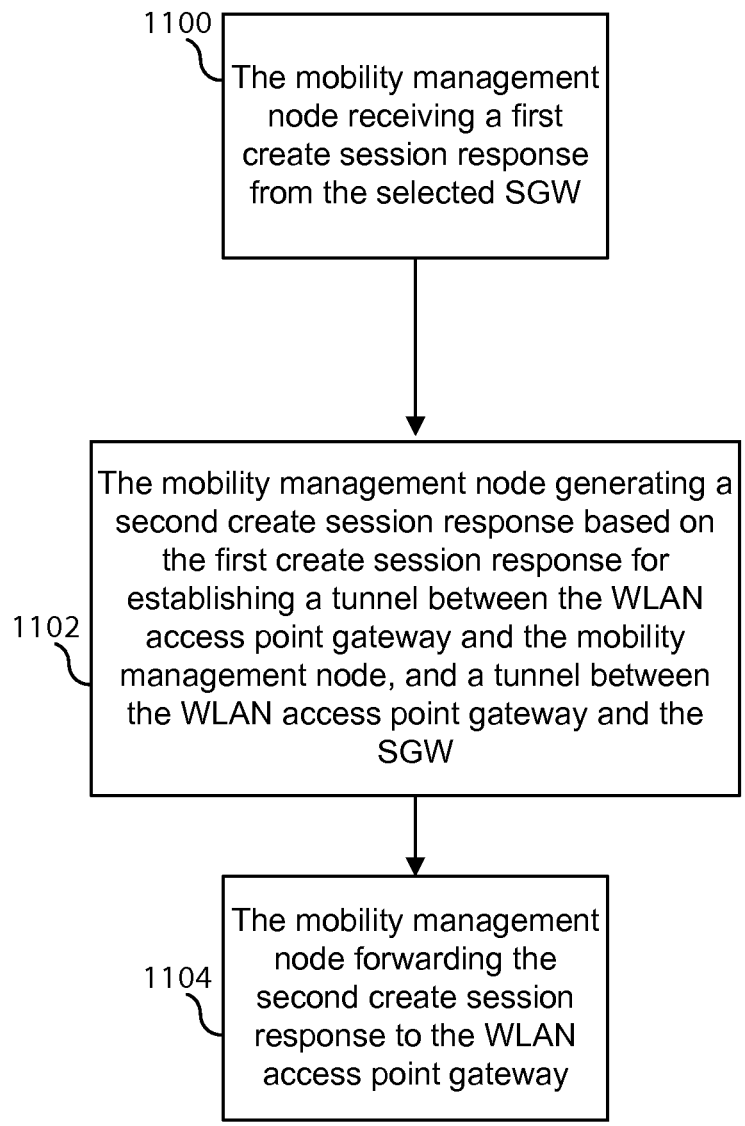
FIG. 11 is a flow chart illustrating a process according to some embodiments.

FIG. 11 illustrates an embodiment of a process performed by a mobility management node. In step 1100, the mobility management node receives a first create session response from the selected SGW. In step 1102, the mobility management node generates a second create session response based on the first create session response for establishing a tunnel between the WLAN access gateway and the mobility management node, and a tunnel between the WLAN access point gateway and the SGW. In step 1104, the mobility management node forwarding the second create session response to the WLAN access gateway.

Figure 12:
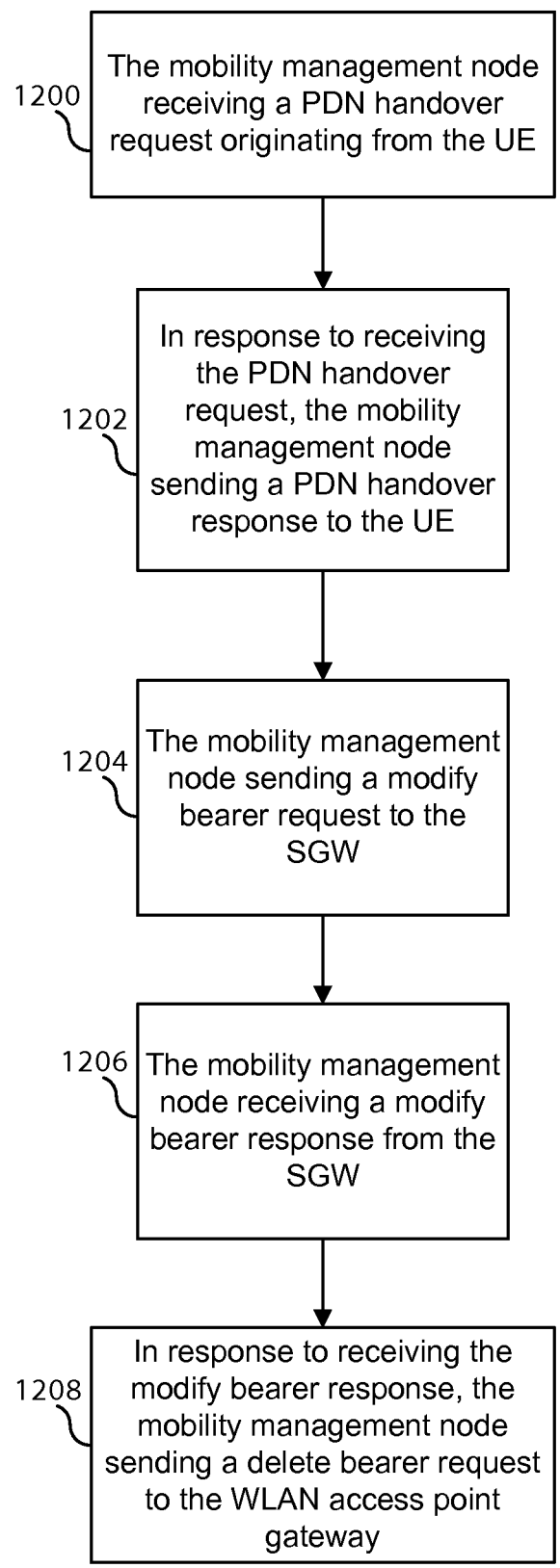
FIG. 12 is a flow chart illustrating a process according to some embodiments.

FIG. 12 is a flow chart illustrating an embodiment of a process for performing handover from Wi-Fi to LTE or 3G. The mobility management node may be an MME or SGSN. The process may start at 1200, where the mobility management node receives attachment PDN handover request originating from the UE. At step 1202, in response to receiving the PDN handover request, the mobility management node sends attachment PDN handover response to the UE. In step 1204, the mobility management node sending a modify bearer request to the SGW. In step 1206, the mobility management node receiving a modify bearer response from the SGW. In step 1208, in response to receiving the modify bearer response, the mobility management node sends a delete bearer request to the WLAN access gateway.

Figure 13:
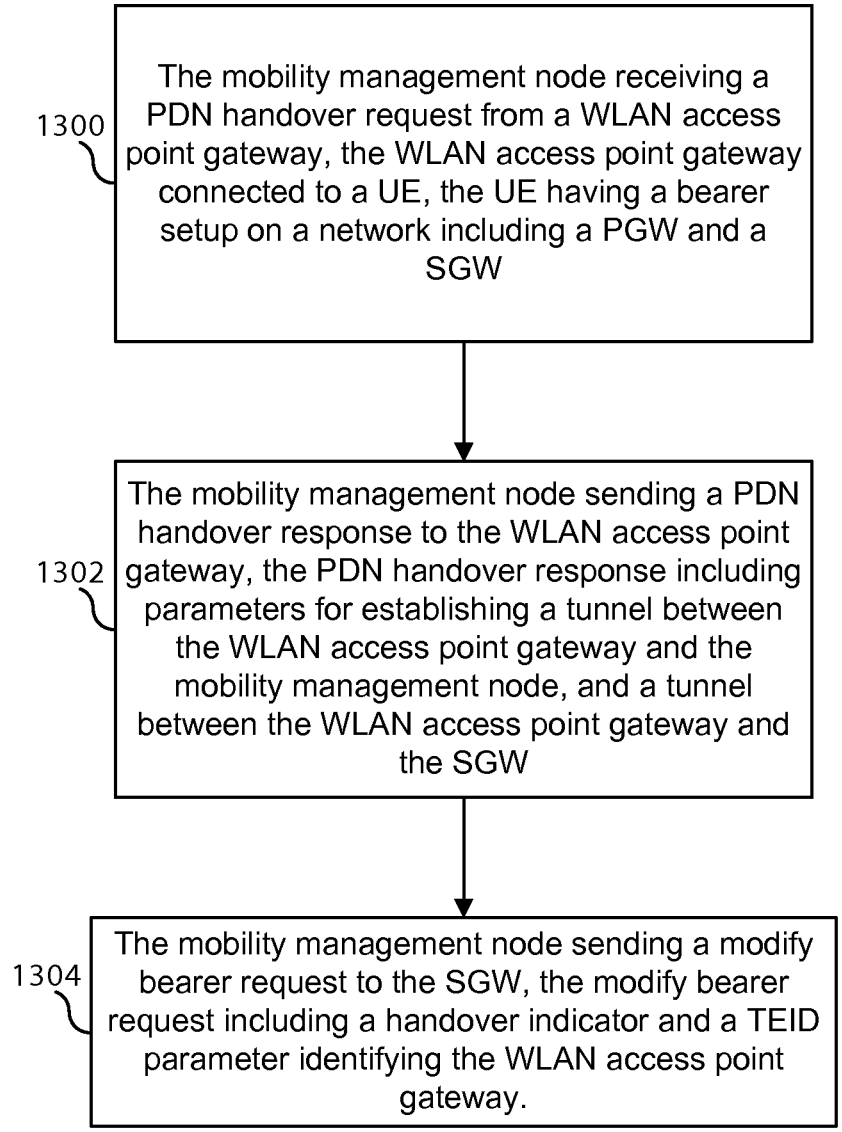
FIG. 13 is a flow chart illustrating a process according to some embodiments.

FIG. 13 is a flow chart illustrating an embodiment of a process for performing handover from LTE or 3G to Wi-Fi. The mobility management node may be an MME or SGSN. The process may start at step 1300, where the mobility management node receives a PDN handover request from a wireless local area network (WLAN) access gateway, where, the WLAN access gateway is connected to a user equipment (UE), and the UE has a bearer setup on a network including a packet data network gateway (PGW) and a serving gateway (SGW). In step 1302, the mobility management node sends a PDN handover response to the WLAN access gateway, where the PDN handover response includes parameters for establishing a control plane tunnel between the WLAN access gateway and the mobility management node, and a user plane tunnel between the WLAN access gateway and the SGW. In step 1304, the mobility management node sends a modify bearer request to the SGW, where the modify bearer request includes a handover indicator and a tunnel endpoint identifier (TEID) parameter identifying the WLAN access gateway.

Figure 14:
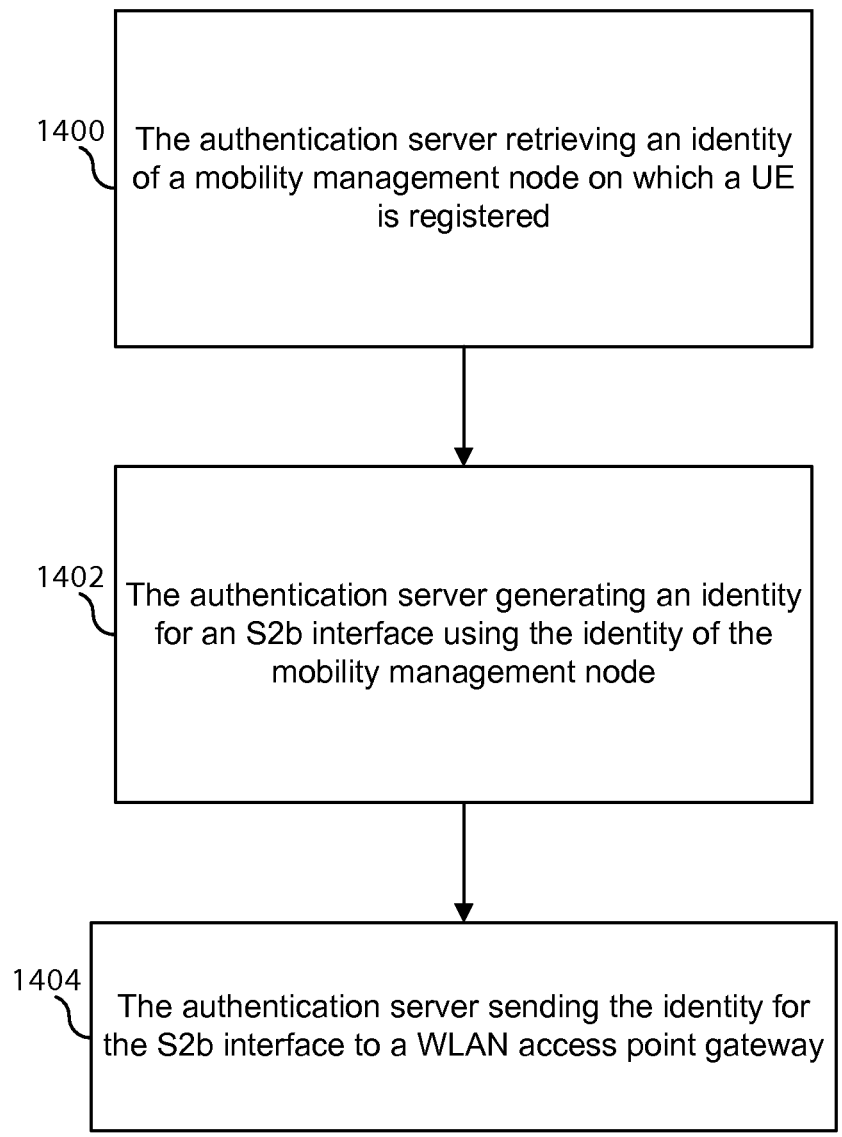
FIG. 14 is a flow chart illustrating a process according to some embodiments.

FIG. 14 is a flow chart illustrating an embodiment of a process performed by an authentication server such as AAA 312. The method may start at step 1400 where the authentication server retrieves an identity of a mobility management node on which a user equipment (UE) is registered. In step 1402, the authentication server generates an identity for an S2b interface using the identity of the mobility management node. In step 1404, the authentication server sends the identity for the S2 interface to a wireless local area network (WLAN) access gateway.

Figure 15:
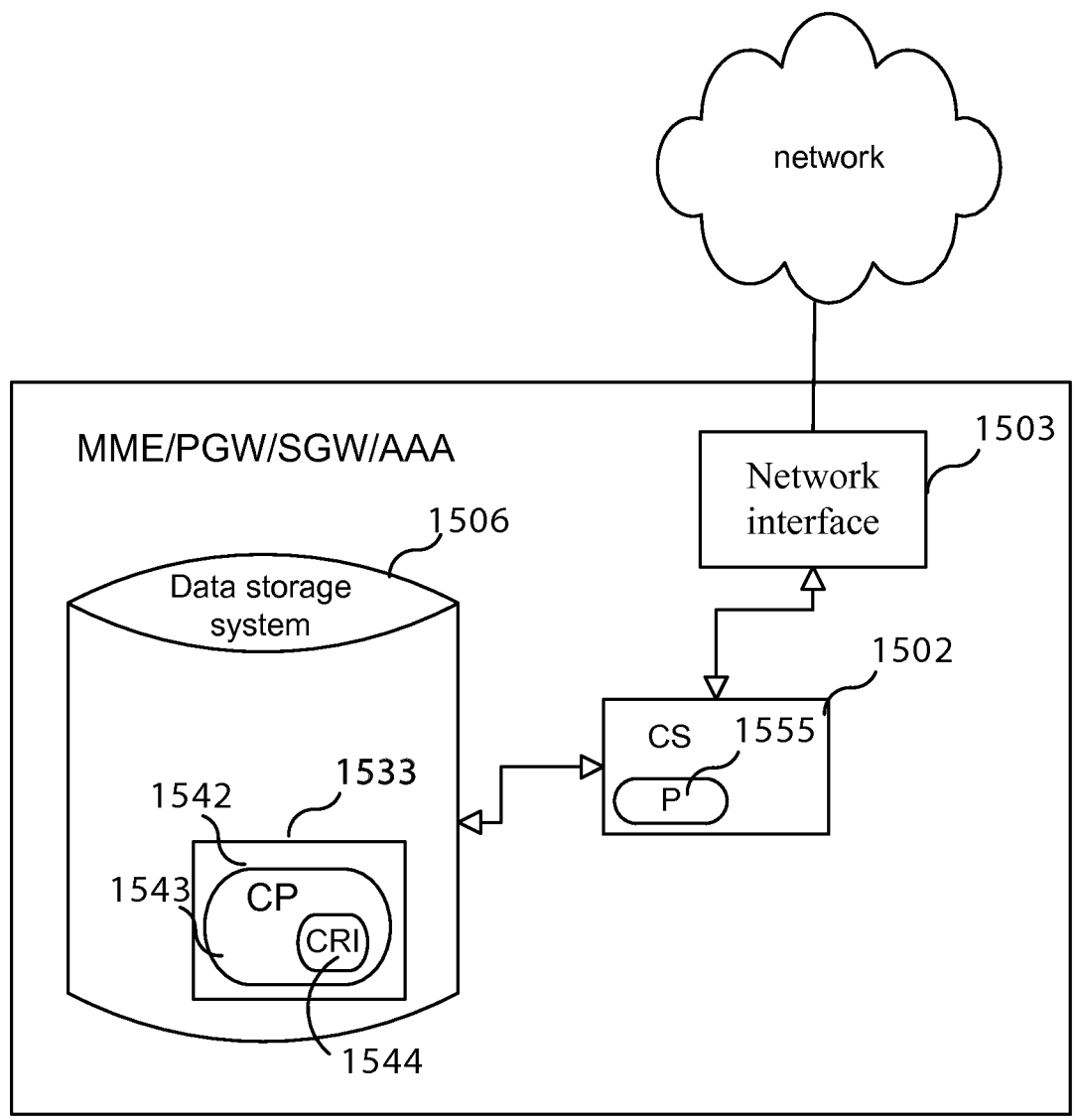
FIG. 15 is a block diagram of a network node according to some embodiments.

FIG. 15 is a block diagram of an embodiment of a network node such as the MME, SGSN, AAA, PGW, and SGW. As shown in FIG. 15, the network node may include or consist of: a computer system (CS) 1502, which may include one or more processors 1555 (e.g., a general purpose microprocessor) and/or one or more circuits, such as an application specific integrated circuit (ASIC), field-programmable gate arrays (FPGAs), a logic circuit, and the like; a network interface 1503 for use in connecting the network node to a network; and a data storage system 1506, which may include one or more non-volatile storage devices and/or one or more volatile storage devices (e.g., random access memory (RAM)). In embodiments where the network node includes a processor 1555, a computer program product (CPP) 1433 may be provided. CPP 1533 includes or is a computer readable medium (CRM) 1542 storing a computer program (CP) 1543 comprising computer readable instructions (CRI) 1544. CRM 1542 is a non-transitory computer readable medium, such as, but not limited, to magnetic media (e.g., a hard disk), optical media (e.g., a DVD), solid state devices (e.g., random access memory (RAM), flash memory), and the like. In some embodiments, the CRI 1444 of computer program 1543 is configured such that when executed by computer system 1502, the CRI causes the network node to perform steps described above (e.g., steps described above with reference to the flow charts and message flows shown in the drawings). In other embodiments, the network node may be configured to perform steps described herein without the need for a computer program. That is, for example, computer system 1502 may consist merely of one or more ASICs. Hence, the features of the embodiments described herein may be implemented in hardware and/or software.

Figure 16:
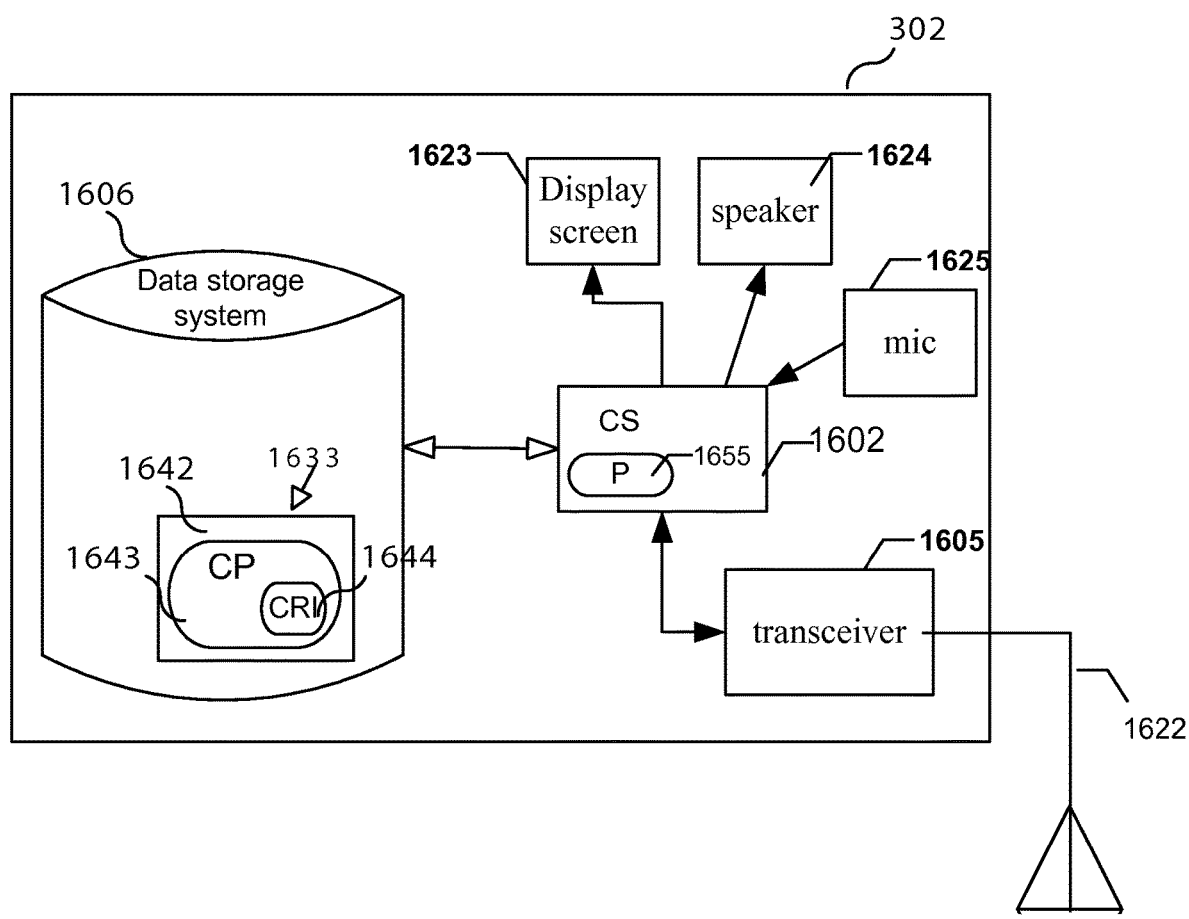
FIG. 16 is a block diagram of a UE according to some embodiments.
Figure 17:
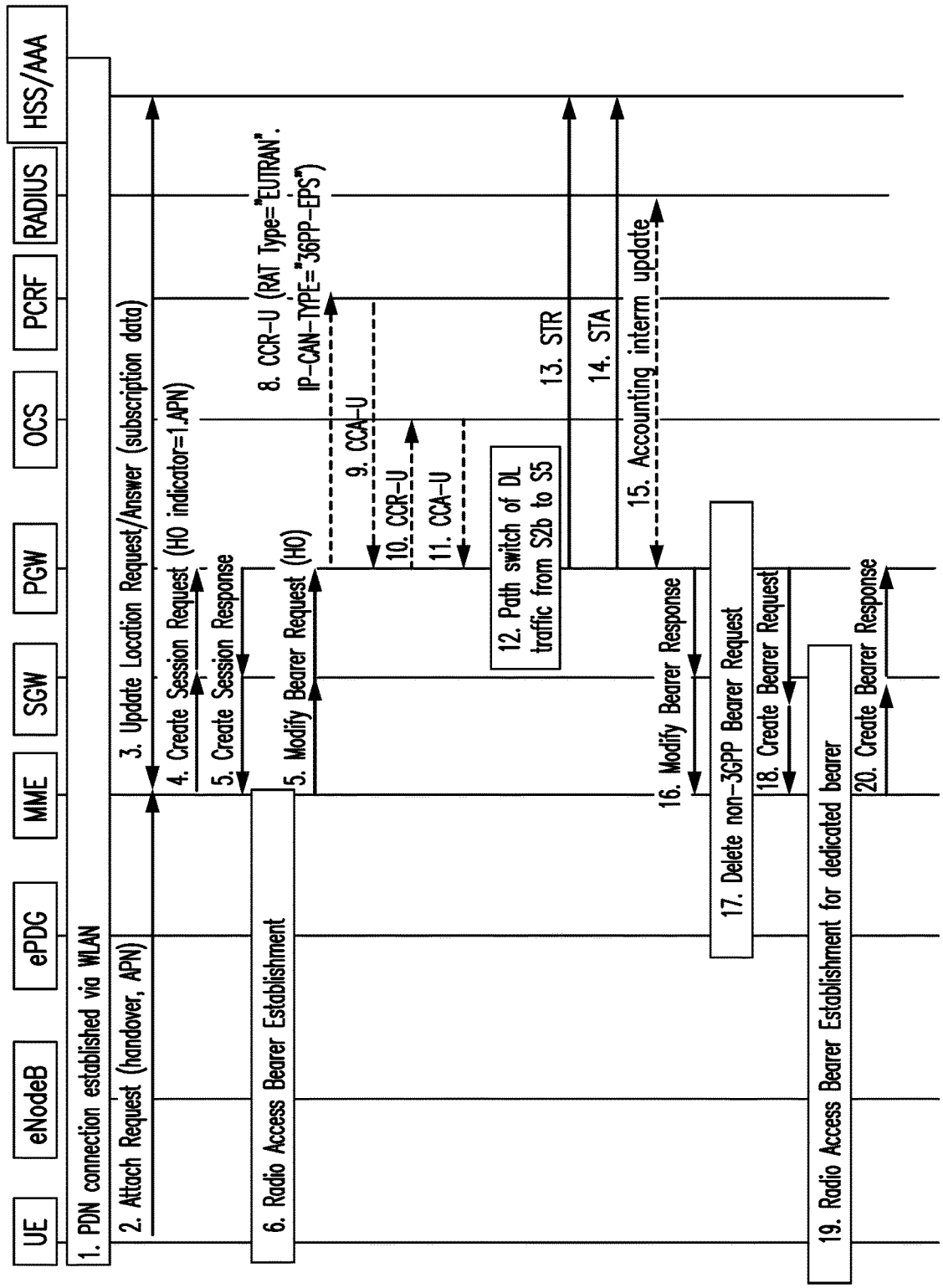
FIG. 17 is a sequence diagram illustrating creation of bearers.

FIG. 16 is a block diagram of UE 302 according to some embodiments. As shown in FIG. 16, UE 302 may include or consist of: a computer system (CS) 1602, which may include one or more processors 1655 (e.g., a general purpose microprocessor) and/or one or more circuits, such as an application specific integrated circuit (ASIC), field-programmable gate arrays (FPGAs), a logic circuit, and the like; a transceiver 1605, coupled to an antenna, 1622 for transmitting and receiving data wireless; and a data storage system 1606, which may include one or more non-volatile storage devices and/or one or more volatile storage devices (e.g., random access memory (RAM)). In embodiments where UE 102 includes a processor 1655, a computer program product (CPP) 1633 may be provided. CPP 1633 includes or is a computer readable medium (CRM) 1642 storing a computer program (CP) 1643 comprising computer readable instructions (CRI) 1644. CRM 1642 is a non-transitory computer readable medium, such as, but not limited, to magnetic media (e.g., a hard disk), optical media (e.g., a DVD), solid state devices (e.g., random access memory (RAM), flash memory), and the like. In some embodiments, the CRI 1644 of computer program 1643 is configured such that when executed by computer system 1602, the CRI causes the UE 102 to perform steps described above (e.g., steps described above with reference to the flow charts and message flows shown in the drawings). In other embodiments, UE 102 may be configured to perform steps described herein without the need for a computer program. That is, for example, computer system 1502 may consist merely of one or more ASICs. Hence, the features of the embodiments described herein may be implemented in hardware and/or software. As shown in FIG. 16, UE 302 may include: a display screen 1633, a speaker 1624, and a microphone ("mica"), all of which are coupled to CS 1602.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

Abbreviations

AAA Authentication, Authorization, and Accounting
APN Access Point Name
EPC Evolved Packet Core
E-UTRAN Evolved Universal Terrestrial Radio Access Network
ePDG Evolved Packet Data Gateway
GPRS General Packet Radio Service
IMS Internet Protocol Multimedia Subsystem
LTE Long Term Evolution
MME Mobility Management Entity
PDN Packet Data Network
PGW PDN Gateway
SGSN GPRS Support Node
SGW Serving Gateway Node
TWAG Trusted Wireless Access Gateway
UE User Equipment
WLAN Wireless Local Area Network

The invention claimed is:

1. A method performed in a mobility management node, the method comprising:
    the mobility management node receiving a first Packet Data Network (PDN) activation request from a wireless local area network (WLAN) access gateway, the first PDN activation request specifying an access point name (APN) and a tunnel endpoint identifier (TEID) parameter for identifying the WLAN access gateway, the WLAN access gateway connected to a user equipment (UE); and
    in response to receiving the PDN activation request, the mobility management node:
        (i) selecting a Packet Data Network Gateway (PGW) based on the specified APN, the selected PGW not in communication with the WLAN access gateway;
        (ii) generating a second PDN activation request that includes the TEID parameter for identifying the WLAN access gateway;
        (iii) selecting a serving gateway (SGW) in communication with the PGW and in communication with the WLAN access gateway; and
        (iv) forwarding the second PDN activation request to the selected SGW.

2. The method according to claim 1, further comprising:
    the mobility management node receiving a first create session response from the selected SGW;
    the mobility management node generating a second create session response based on the first create session response for establishing a control plane tunnel between the WLAN access gateway and the mobility management node, and a user plane tunnel between the WLAN access gateway and the SGW; and
    the mobility management node forwarding the second create session response to the WLAN access gateway.

3. The method according to claim 2, wherein the mobility management node generates the second create session response by (i) setting a TEID parameter specified for a PGW-C S2b or S2a to the mobility management node, and (ii) setting a TEID parameter specified for a PGW-U S2b or S2a to a SGW-U.

4. The method according to claim 2, further comprising:
    the mobility management node receiving a PDN handover request originated from the UE;
    in response to receiving the PDN handover request, the mobility management node sending PDN handover response to the UE;
    the mobility management node sending a modify bearer request to the SGW;
    the mobility management node receiving a modify bearer response from the SGW; and
    in response to receiving the modify bearer response, the mobility management node sending a delete bearer request to the WLAN access gateway.

5. The method according to claim 4, wherein the PDN handover request is an attachment request with a handover indicator.

6. The method according to claim 2, wherein the first create session response is generated by the PGW and forwarded by the SGW to the mobility management node.

7. The method according to claim 2, wherein the first create session response includes at least one UE parameter.

8. The method according to claim 1, wherein the mobility management node sets a user location information parameter in the second PDN activation request in accordance with location information stored in a 3GPP registration context of the UE.

9. The method according to claim 1, wherein the WLAN access gateway is an evolved Packet Data Gateway (ePDG).

10. The method according to claim 1, wherein the WLAN access gateway is Trusted Wireless Access Gateway (TWAG).

11. The method according to claim 1, wherein the mobility management node is a mobility management entity (MME) node.

12. The method according to claim 1, wherein the mobility management node is a serving GPRS support node (SGSN).

13. The method according to claim 1, wherein the first and second PDN activation requests are create session request messages.

14. A method performed in a mobility management node, the method comprising:
    the mobility management node receiving a Packet Data Network (PDN) handover request from a wireless local area network (WLAN) access gateway, the WLAN access gateway connected to a user equipment (UE), the UE having a bearer setup on a network including a packet data network gateway (PGW) and a serving gateway (SGW), the PGW not being in communication with the WLAN access gateway, the SGW being in communication with the PGW and with the WLAN access gateway;
    the mobility management node sending a PDN handover response to the WLAN access gateway, the PDN handover response including parameters for establishing a control plane tunnel between the WLAN access gateway and the mobility management node, and a user plane tunnel between the WLAN access gateway and the SGW; and
    the mobility management node sending a modify bearer request to the SGW, the modify bearer request including a tunnel endpoint identifier (TEID) parameter identifying the WLAN access gateway.

15. The method according to claim 14, wherein the PDN handover response includes (i) a TEID parameter specified for a PGW-C set to the mobility management node, and (ii) a TEID parameter specified for a PGW-U set to the SGW-U.

16. The method according to claim 14, wherein the PDN handover response includes a create bearer request in response to the mobility management node determining that at least one dedicated bearer is required.

17. The method according to claim 14, wherein the WLAN access gateway is an evolved Packet Data Gateway (ePDG).

18. The method according to claim 14, wherein the WLAN access gateway is Trusted Wireless Access Gateway (TWAG).

19. The method according to claim 14, wherein the mobility management node is a mobility management entity (MME) node.

20. The method according to claim 14, wherein the mobility management node is a serving GPRS support node (SGSN).

21. The method according to claim 14, wherein the PDN handover request is a create session request with a handover indicator.

22. A mobility management node comprising:
a processor; and
a computer readable medium coupled to the processor, the computer readable medium containing instructions executable by the processor to cause the mobility management node to:
receive a first Packet Data Network (PDN) activation request from a wireless local area network (WLAN) access gateway, the first PDN activation request specifying an access point name (APN) and a tunnel endpoint identifier (TEID) parameter for identifying the WLAN access gateway, the WLAN access gateway connected to a user equipment (UE); and
in response to receiving the PDN activation request:
(i) select a Packet Data Network Gateway (PGW) based on the specified APN, the selected PGW not in communication with the WLAN access gateway,
(ii) generate a second PDN activation request that includes the TEID parameter for identifying the WLAN access gateway,
(iii) select a serving gateway (SGW) in communication with the PGW and in communication with the WLAN access gateway, and
(iv) forward the second PDN activation session request to the selected SGW.

23. The mobility management node according to claim 22, wherein the mobility management node is further configured to:
receive a first create session response from the selected SGW;
generate a second create session response based on the first create session response for establishing a control plane tunnel between the WLAN access gateway and the mobility management node, and a user plane tunnel between the WLAN access gateway and the SGW; and
forward the second create session response to the WLAN access gateway.

24. The mobility management node according to claim 23, wherein the mobility management node generates the second create session response by (i) setting a TEID parameter specified for a PGW-C S2b or S2a to the mobility management node, and (ii) setting a TEID parameter specified for a PGW-U S2b or S2a to the SGW-U.

25. The mobility management node according to claim 23, wherein the mobility management node is configured to:
receive a PDN handover request originating from the UE;
in response to receiving the PDN handover request, send a PDN handover response to the UE;
send a modify bearer request to the SGW;
receive a modify bearer response from the SGW; and
in response to receiving the modify bearer response, send a delete bearer request to the WLAN access gateway.

26. The mobility management node according to claim 25, wherein the PDN handover request is an attachment request with a handover indicator.

27. The mobility management node according to claim 22, wherein the mobility management node sets a user location information parameter in the second PDN activation request in accordance with location information stored in a 3GPP registration context of the UE.

28. The mobility management node according to claim 22, wherein the first create session response is generated by the PGW and forwarded by the SGW to the mobility management node.

29. The mobility management node according to claim 22, wherein the first create session response includes at least one UE parameter.

30. The mobility management node according to claim 22, wherein the WLAN access gateway is an evolved Packet Data Gateway (ePDG).

31. The mobility management node according to claim 22, wherein the WLAN access gateway is Trusted Wireless Access Gateway (TWAG).

32. The mobility management node according to claim 22, wherein the mobility management node is a mobility management entity (MME) node.

33. The mobility management node according to claim 22, wherein the mobility management node is a serving GPRS support node (SGSN).

34. The mobility management node according to claim 22, wherein the first and second PDN activation requests are create session request messages.

35. A mobility management node comprising:
a processor; and
a computer readable medium coupled to the processor, the computer readable medium containing instructions executable by the processor to cause the mobility management node to:
receive a Packet Data Network (PDN) handover request from a wireless local area network (WLAN) access gateway, the WLAN access gateway connected to a user equipment (UE), the UE having a bearer setup on a network including a packet data network gateway (PGW) and a serving gateway (SGW), the PGW not being in communication with the WLAN access gateway, the SGW being in communication with the PGW and with the WLAN access gateway;
send a PDN handover response to the WLAN access gateway, the PDN handover response including parameters for establishing a control plane tunnel between the WLAN access gateway and the mobility management node, and a user plane tunnel between the WLAN access gateway and the SGW; and
send a modify bearer request to the SGW, the modify bearer request including a tunnel endpoint identifier (TEID) parameter identifying the WLAN access gateway.

36. The mobility management node according to claim 35, wherein the PDN handover response includes (i) a TEID parameter specified for a PGW-C set to the mobility management node, and (ii) a TEID parameter specified for the PGW-U set to a SGW-U.

37. The mobility management node according to claim 35, wherein the PDN handover response includes a create bearer request in response to the mobility management node determining that at least one dedicated bearer is required.

38. The mobility management node according to claim 35, wherein the WLAN access gateway is an evolved Packet Data Gateway (ePDG).

39. The mobility management node according to claim 35, wherein the WLAN access gateway is Trusted Wireless Access Gateway (TWAG).

40. The mobility management node according to claim 35, wherein the mobility management node is a mobility management entity (MME) node.

41. The mobility management node according to claim 35, wherein the mobility management node is a serving GPRS support node (SGSN).

42. The mobility management node according to claim 35, wherein the PDN handover request is a create session request with a handover indicator.

* * * * *